United States Patent [19]

Memminger et al.

[11] Patent Number: 4,752,044
[45] Date of Patent: Jun. 21, 1988

[54] YARN SUPPLY APPARATUS WITH ELECTRONIC YARN TENSION CONTROL, PARTICULARLY FOR KNITTING MACHINES HAVING RAPIDLY VARYING YARN SUPPLY REQUIREMENTS

[75] Inventors: Gustav Memminger, Heideweg 65, D-7290 Freudenstadt; Falk Kuhn, Kiebingen; Heinz Fabschitz, Westerham, all of Fed. Rep. of Germany

[73] Assignee: Gustav Memminger, Freudenstadt, Fed. Rep. of Germany

[21] Appl. No.: 84,515

[22] Filed: Aug. 10, 1987

[30] Foreign Application Priority Data

Aug. 16, 1986 [DE] Fed. Rep. of Germany ....... 3627731

[51] Int. Cl.[4] .................. B65H 51/20; B65H 51/30
[52] U.S. Cl. ............... 242/47.01; 66/125 R; 66/132 R; 66/146; 242/45; 242/47; 242/54 R
[58] Field of Search ............. 242/47.01, 45, 75.5, 242/75.51, 75.52, 54 R, 47; 226/42, 43, 44, 24; 66/125 R, 132 R, 132 T, 146; 139/452

[56] References Cited

U.S. PATENT DOCUMENTS

| | | | |
|---|---|---|---|
| 2,938,365 | 5/1960 | Lassiter | 66/132 R |
| 3,083,924 | 4/1963 | Vossen et al. | 66/132 R X |
| 3,093,330 | 6/1963 | Schmidt | 242/45 |
| 3,677,036 | 7/1972 | Hatay | 66/125 R X |
| 3,858,416 | 1/1975 | White et al. | 66/132 R |
| 3,962,891 | 6/1976 | Rouzaud | 66/132 R |
| 4,673,139 | 6/1987 | Memminger et al. | 242/47.01 |
| 4,706,476 | 11/1987 | Memminger et al. | 242/47.01 X |

*Primary Examiner*—Stanley N. Gilreath
*Attorney, Agent, or Firm*—Frishauf, Holtz, Goodman & Woodward

[57] ABSTRACT

A yarn supply element (5, 150) that supplies the yarn substantially without slip and is rotatably supported has yarn guide elements (14, 15, 16; 158) and is coupled to an electric motor (3) of regulated frequency that drives it. In the yarn travel path following the yarn supply element, there are yarn tension sensing means (21) that monitor the yarn (17) unwinding from the yarn supply element and that emit and electrical signal that is supplied to a control circuit (52), which supplies the motor with a frequency signal. To assure satisfactory yarn supply even in the event of abrupt changes in yarn utilization, a device (21, 19) for forming a yarn reserve is provided along the yarn travel path following the yarn supply element. The size of the yarn reserve is dimensioned to be sufficient to cover the yarn requirement during start up of the motor. Associated with this device are means (28, 50-55) for automatically refilling the yarn reserve to an original size no later than after the startup of the motor. Furthermore the control circuit also has a circuit arrangement (63) which at least during the startup of the motor limits the variation over time of the frequency of the frequency signal (53) in such a manner that the loaded motor is capable of following up the change in frequency.

34 Claims, 13 Drawing Sheets

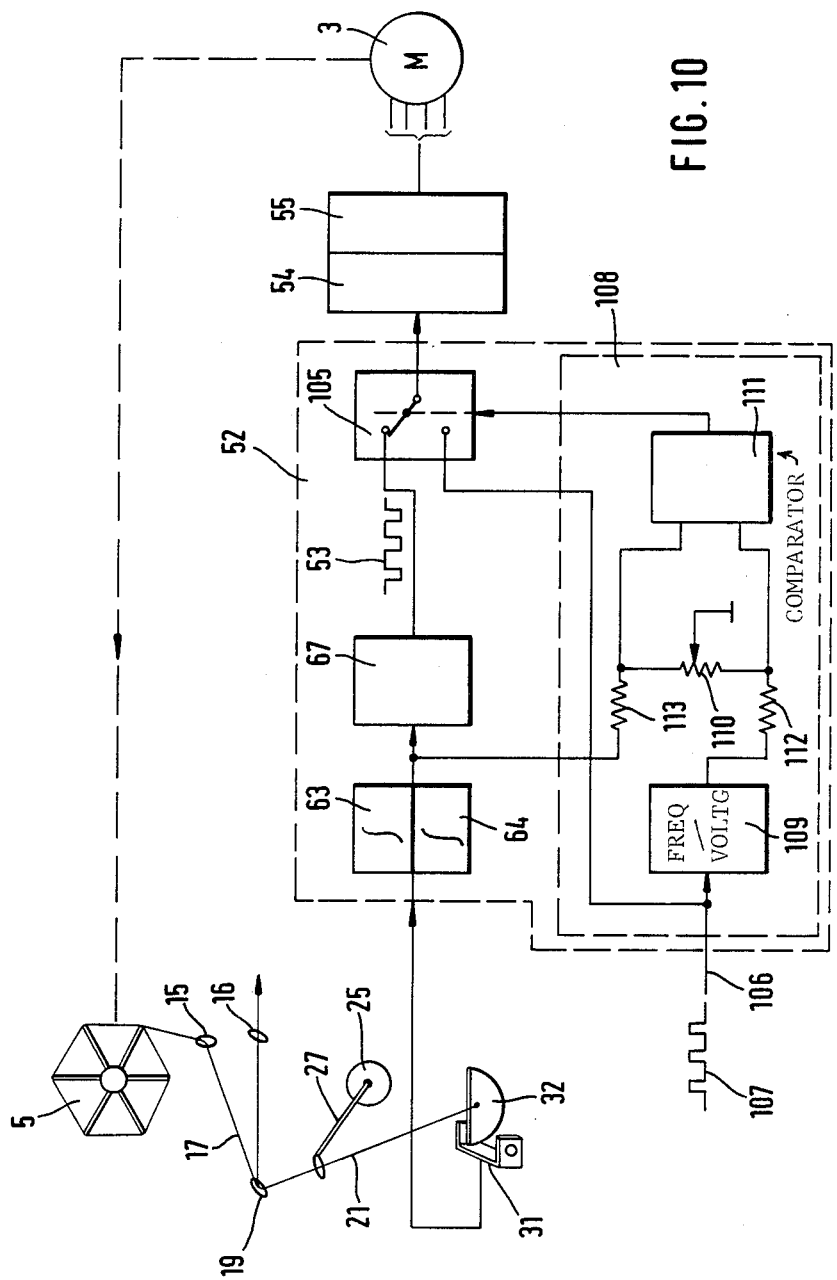

YARN SUPPLY APPARATUS WITH ELECTRONIC YARN TENSION CONTROL, PARTICULARLY FOR KNITTING MACHINES HAVING RAPIDLY VARYING YARN SUPPLY REQUIREMENTS

The present invention relates to a yarn supply apparatus for textile machines, in which the yarn tension is electronically controlled, and more particularly to yarn supply apparatus for knitting machines having yarn requirements which vary widely and require rapid changes in yarn supply speed, especially to circular knitting machines having striping apparatus.

BACKGROUND

Various yarn supply devices supply yarn from a yarn supply storage winding on a drum, cage, or the like, in short, a yarn supply means in which the yarn is supplied under essentially slip-less conditions. The yarn supply drum is driven by a motor. The speed of the motor is easily controlled if the motor is a stepping motor or other motor in which the speed depends on the frequency, or repetition rate of pulses which are supplied to the motor. Suitable yarn guide elements are associated with the yarn supply means, including yarn tension sensors, such as spring-loaded bails or the like, in engagement with the yarn, and providing an output signal which controls the frequency of the power supply to the electric motor. A control system is provided, receiving the sensing signal from the yarn tension sensor, receiving a command signal, and, in turn, controlling the frequency, or pulse repetition rate of the power supply to the motor to maintain the yarn tension essentially constant and in conformity with the command value.

In a yarn supply apparatus of this kind known from U.S. Pat. No. 3,858,416, which is hereby incorporated by reference, the sensing means having a linearly movable yarn guide element that senses the yarn passing over it emit an analog tension signal that is representative of the yarn tension and is compared with a fixed command value tension.

The differential tension corresponding to the control deviation is amplified and processed for generating a positioning signal, which is supplied as a frequency signal to the frequency-controlled drive motor of the yarn supply element. A signal generator is associated with the drive motor, emitting a signal that is representative of the speed of the drive motor and hence of the quantity of yarn supplied per unit of time, and this signal can be compared—as a function of the position of a switchover element—with a synchronization signal converted into an analog tension, the synchronization signal being furnished by a second signal generator that measures the speed of the needle cylinder of the circular knitting machine equipped with the yarn supply apparatus. The control deviation thus obtained, corresponding to the differential tension, is processed by the controller into a corresponding control signal for the motor, so that the speed of the motor and hence the yarn supply speed are synchronized with the speed of the needle cylinder of circular knitting machine. By appropriate manual actuation of the switchover element, a constant yarn tension or a yarn supply quantity that is in a fixed ratio to the speed of the circular knitting machine can be controlled selectively.

The basic problem in this kind of yarn supply apparatus is that it is incapable of following along with rapid changes in yarn tension or yarn travel speed. For example, in yarn-striping operation in circular knitting machines, extremely fast changes in yarn utilization occur, which is also true to a lesser extent for Jacquard machines. For instance, in a conventional circular knitting machine yarn utilization during the striping operation is typically approximately 4 m/sec at a knitting feed. Now if the striping apparatus, in accordance with its program, removes the yarn travelling at this speed and at the same time inserts a new, as yet unprocessed and therefore non-moving yarn, then this yarn change takes place within fractions of milliseconds. This means that within this short period of time, the old yarn is brought from its yarn travel speed of approximately 4 m/sec to a stop, and the new yarn must be accelerated up to the full yarn supply speed of 4 m/sec within this same short period of time. The unavoidable inertia of the motor and yarn supply element alone precludes such rapid movement, resulting in impermissible peak yarn tensions. However, the discontinuance characteristic of the motor prevents its being shut down within the required short period of time, so that loops form in the yarn that is being brought to a stop in the yarn supply element, and the yarn tension breaks down completely.

A further factor is that in a frequency-controlled motor, that is, a synchronous motor or stepping motor, which is particularly advantageous because it can be controlled exactly, the frequency upon startup and shutdown cannot be increased arbitrarily quickly from the starting frequency to the frequency appropriate for steady state operation, nor decreased from this frequency to the stopping frequency, because otherwise the motor is no longer able, with its rotary speed, to follow up this rapid change in frequency; it falls out of step and stops.

For these reasons, the known yarn supply apparatus is suitable only for yarn-utilizing textile machines in which particularly fast or abrupt changes in the yarn consumption do not occur. This applies, for example, to circular knitting machines that process plain, non-patterned tubular goods.

THE INVENTION

It is an object to provide a yarn supply apparatus which is simple, reliable, requires little power, and is especially suitable for rapidly providing yarn under operating conditions which may require acceleration/deceleration, practically instantaneously, that is within essentially milliseconds from stop condition to a supply speed of about 10 meters per second, and back to stop, that is, is suitable for yarn supply which changes rapidly and abruptly while insuring that the tension with which the yarn is being supplied remains essentially constant under positive yarn supply conditions.

Briefly, a yarn reserve is formed, by extending the path of the yarn from the yarn supply drum or the like in a yarn reserve path. The yarn reserve path is of sufficient capacity to supply yarn from storage in the yarns reserve under starting conditions of the motor driving the yarn supply drum; and, preferably, to increase the yarn reserve, that is, to store more yarn when the motor is being stopped, in order to prevent the formation of loose loops. The yarn reserve, thus, permits supply of yarn, essentially under predetermined tension conditions, before the motor has reached a speed at which, under control of the command value, it can control supply of the yarn under the tension command value. A yarn reserve sensing element is provided, which controls the motor to reestablish a predetermined yarn reserve after a change of the yarn in the reserve from a predetermined reserve value under transient operating conditions of the motor. Preferably, the yarn reserve is reestablished as soon as the motor has started and accelerated to an essentially steady state speed. Additionally, and in order to maintain synchronism between motor operation and the frequency of supplied power, or, if pulses, the pulse repetition rate, the control circuit includes circuit structures, typically integrators, which have a time constant matched to the operating characteristics of the motor, loaded by the yarn supply drum or the like, such that synchronism between motor operation and command pulses is ensured. This effectively prevents loss of synchronism and, if the motor is a stepping motor, stopping of the motor because it is unable to follow the frequency, or pulse repetition rate of the control pulses, for example due to inertia, friction or the like.

If an abrupt change in the yarn requirement arises with this yarn supply apparatus, for example because the striping apparatus is inserting the previously stopped thread, then the yarn reserve holds an amount adequate to meet the instantaneous yarn requirement, while the motor is accelerated at the same time. The acceleration of the motor takes place in accordance with its startup characteristic, without the danger that the motor will fall out of step, or out of synchronism with supply frequency. On the other hand, the yarn is not subjected to excessive tensions while it is being taken from the yarn reserve.

Upon a sudden severe reduction in the yarn requirement, such as arises when the striping apparatus removes yarn, i.e., discontinues yarn feeding, the yarn supply element that is coupled to the motor and is coming to a stop would no longer be received by the yarn utilizing station and would therefore supply an excess of yarn, causing the formation of loops and the collapse of the yarn tension. To avoid such a situation, it is advantageous for the circuit of the control system to limit the change in frequency of the frequency signal, at least during shutdown of the motor, in such a way that the loaded motor is capable of following the change in frequency, and means for receiving the excess yarn, furnished during the discontinuance, in the yarn reserve are associated with the device for forming the yarn reserve, so that the yarn tension is always maintained.

To limit the change in frequency of the frequency signal as a function of the startup characteristic or discontinuance characteristic of the motor coupled to the yarn supply element, the circuit means of the control system, in a preferred embodiment, can have an integrator for the electrical signal emitted by the yarn sensing means, the time constant of the signal and hence the duration of the startup or discontinuance phase of the motor being dimensioned such that the motor is always capable of following the frequency change without falling out of step.

The driving torque is counteracted during motor acceleration of the motor not only by its mass inertia but also by its frictional torque. During motor deceleration, the frictional torque has a braking effect; therefore it is suitable for the integrator associated with the startup of the motor to have a greater time constant than the integrator associated with the discontinuance of the motor. In a simple, practical embodiment this can be attained by providing that the two integrators are formed by a resistor-capacitor or RC element, the ohmic resistance of which can be switched back and forth between two different values as a function of a signal.

The yarn reserve forming means advantageously has a yarn guide element that is movably supported over a predetermined path, and with which at least one fixed yarn guide element is associated, which with the movable yarn guide element forms a prolongated yarn travel path, and the movable yarn guide element is subjected to an adjustable command force acting contrary to the yarn tension force engaging it and is coupled with a signal transducer of the sensing means, which generates a signal dependent on the position of the movable yarn guide element, as a signal representative of the yarn tension.

The means for sensing the position of the movable yarn guide element can be constructed very simply. In a preferred embodiment, the signal transducer is an electro-optical signal transducer sensing the movable yarn guide element or some part connected with it, and is very well suited for this purpose because it does not exert any force at all upon the movable yarn guide element that could affect the accuracy of control.

The signal generated by the signal transducer can have a predetermined function dependency on the particular position of the movable yarn guide element, such that with increasing deflection of the yarn guide element in a direction of increasing yarn tension, the signal increases in a less-than-proportional manner, so that the deflection of the movable yarn guide element does not become excessive either.

The signal emitted by the signal transducer is thus representative of not only a change in the yarn tension but also of the position of the yarn guide element and hence of the size of the yarn reserve. From this signal, the positioning signal for the motor coupled with the yarn supply element is derived in the control system; this positioning signal varies the speed of the motor and hence the yarn supply speed in such a way that on the one hand the yarn tension is kept at the particular predetermined command value and on the other the size of the yarn reserve—because of the position of the yarn element—is always returned to an initial value (dependent on the yarn travel speed) in the event of a deflection of the yarn guide element.

DRAWINGS

FIG. 1, a yarn supply apparatus according to the invention, in a schematic perspective view;

FIG. 2, a side view of the yarn supply apparatus of FIG. 1 in a section taken along the line II—II of FIG. 1, with the yarn brake on the input side not shown;

FIG. 10 is a block circuit diagram similar to FIG. 7 showing a yarn supply apparatus according to FIG. 1 that can be synchronized with an external synchronization source;

DETAILED DESCRIPTION

Figure 1:
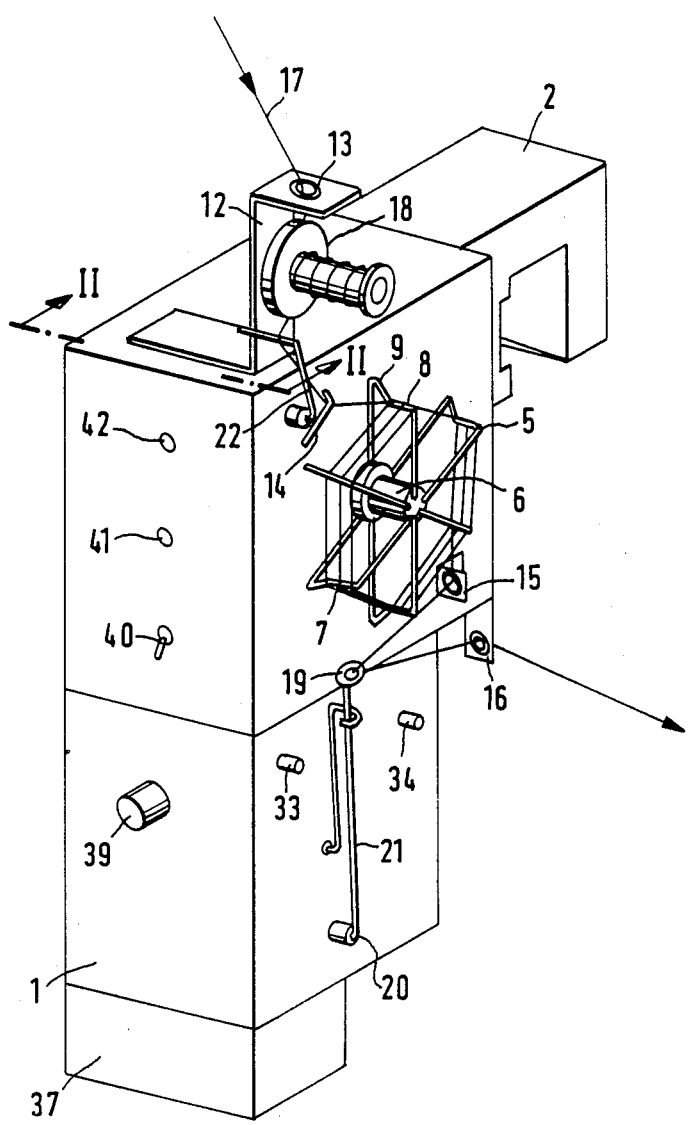
Figure 2:
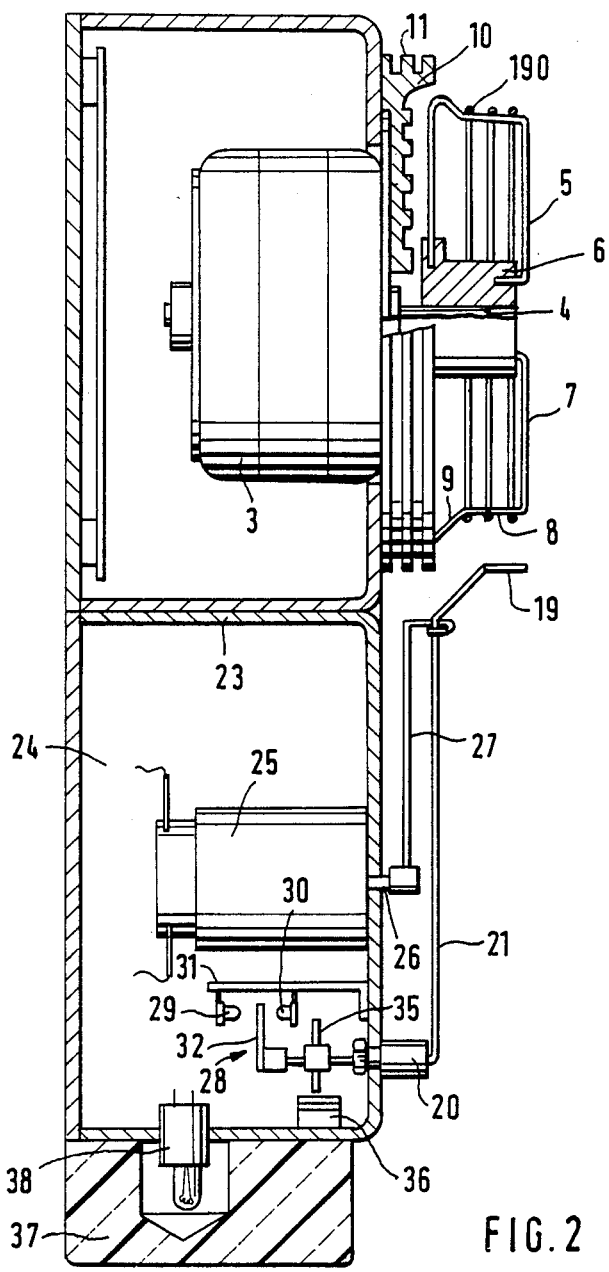

The yarn supply apparatus schematically shown in FIG. 1 has a housing 1 secured to a holder 2, which is arranged for being fastened to the frame ring of the circular knitting machine, not otherwise shown, and in the vicinity of which electrical connection terminals, also not otherwise shown, are provided for the electrical and electronic components accommodated in the interior of the housing 1. As FIG. 2 shows, an electric stepping motor 3 is located in the upper part of the housing 1, protruding with its shaft 4 through a corresponding opening in the front wall of the housing and driving a yarn wheel secured to rotate with the shaft 4. The yarn wheel 5 comprises a hub 6 mounted on the shaft 4 and a number of bent U-shaped bails 7 connected at their ends to the hub 6, each of which has a substantially axially parallel yarn support region 8 and an inclined run-on portion 9 adjoining it. For good dissipation of heat from the housing, the stepping motor 3 is secured with its bearing plate on a plate-like heat sink 10 made of light metal, which in turn is screwed onto the outside of the front wall of the housing 1 and extends substantially behind the yarn wheel 5. The heat sink 10 has formed-on cooling fins 11, which increase the surface area used for dissipation of heat to the ambient air.

Associated with the yarn wheel 5 forming the yarn supply element are stationary yarn guide elements located on the housing 1, and comprising a run-in or supply eye 13 provided on a holder 12 attached to the housing, a yarn deflection hook 14 located on the front housing wall in the vicinity of the yarn wheel 5, and two yarn eyes 15, 16 located on the yarn run-out side of the yarn wheel 5 on the housing.

The yarn 17 arriving from the yarn source, such as a yarn package, not otherwise shown, travels through the run-in eye 13 via an adjustable yarn disk brake 18 located on the holder 12 and via the deflection hook 14 and runs up on the yarn drum 5 in the vicinity of the inclined run-on portion 9 of the bails 7, which push the yarn loops that form onto the yarn support portions 8 of the bails 7, on which a looped yarn store made up of a number of yarn windings or loops 190 (see FIG. 2) forms; together with the narrow support portions 8, this assures a substantially slip-less drive of the yarn 17 at the circumference of the yarn wheel 5.

From the yarn store 190, the yarn 17 travels through the first stationary yarn eye 15 on the run-out side, and then through a yarn eye 19 at the end of a yarn guide arm 21 forming a movable yarn guide element pivotably supported on its other end, at 20, on the housing 1; from there, the yarn travels back to the second stationary yarn eye 16, which is located somewhat below the first yarn eye 15 but laterally in its immediate vicinity.

From the second yarn eye 16, yarn travels to a utilization station, not otherwise shown, which in the case of a knitting machine is the needles of a yarn feed.

On the run-on side, the yarn 17 is monitored in the region between the yarn brake 18 and the deflection hook 14 by a yarn run-on sensor 22, which in the event of yarn breakage switches over a switch that is located in the housing 1 and is actuated by the sensor arm of this sensor 22; the switch then emits an electrical shutoff signal that brings the machine to a stop.

In accordance with a feature of the invention, the pivotably supported yarn guide arm 21, with its yarn eye 19, forms a yarn reserve on the outgoing side of the yarn wheel 5, between the fixed yarn eyes 15, 16. This yarn reserve forms a substantially V-shaped prolongated yarn travel path. The size of the yarn reserve depends on the angular position of the yarn guide arm 21.

From FIG. 2 it can be seen that in a lower housing portion 24, partitioned off by a partition 23, a small direct current motor 25 is fastened to the front wall of the housing, protruding with its shaft 26 protrudes through a corresponding opening in the front wall of the housing and having a substantially L-shaped operating lever 27 mounted on it so as to rotate with the shaft. This lever 27 is braced unilaterally at one end against the yarn guide arm 21 and thus urges the arm 21 to pivot counterclockwise with respect to FIG. 1.

The permanent magnet field direct current motor 25, which is preferably embodied as a bell-rotor or external rotor motor, can also be replaced by an arrangement similar to a d'Arsonval meter, because of the restricted rotational angle range of the yarn guide arm 21 coupled with it. It forms an electromagnetic command transducer, which via the operating lever 27 exerts an accurately predetermined, adjustable command force upon the yarn guide arm 21 and its eye 19. This command force is the tension force exterted by the yarn guided through the eye 19 and is dependent on the yarn tension; that is, the command force is oriented toward the left in terms of FIG. 1.

Coupled with the pivot shaft 20 of the yarn guide arm 21 is an electro-optical signal transducer 28, which senses the angular position of the yarn guide arm 21 and—as will be explained in further detail below—emits a signal that is representative of the tension of the yarn 19 travelling through the yarn eye 19 of the yarn guide arm 21; at the same time, this signal is also representative of the angular position of the yarn guide arm 21 and hence of the size of the aforementioned yarn reserve.

The signal transducer 28 comprises a luminescent diode (LED) 29 and a phototransistor 30 located in the path of the beam of the LED 29, and both the LED 29 and the phototransistor 30 are mounted on a holder 31 attached to the housing. Protruding into the path of the beam of the LED 29 to a variable extent with its edge is a dimmer plate 32 secured to the shaft 20 of the yarn guide arm 21, its edge basically having the shape indicated by FIG. 9, essentially in accordance with an exponential function.

In accordance with the pivoting of the yarn guide arm 21, the phototransistor 30 is shielded to a variable extent from the LED 29 by the dimmer plate 32, so that at the output of the phototransistor 30 an analog signal appears, which has a fixed functional dependency, defined by the outline of the dimmer plate 32, with the angular position of the yarn guide arm 21.

The pivoting movement of the yarn guide arm 21 is limited in both rotational directions by two stop pins 33, 34 (FIG. 1). If there is no removal of the yarn, then the yarn guide arm 21 is located in the vicinity of the left stop 33; with increasing yarn travel speed, or in other words increasing speed of the yarn wheel 5, it moves to the right toward the other stop pin 34, but in normal operation it cannot reach this stop pin. The yarn guide arm 21 comes to rest on the stop pin 33 or on the stop pin 34 only in the case of a malfunction, as will now be explained:

If a yarn break occurs or if the tension of the yarn unwinding from the yarn wheel 5 breaks down for some other reason, the yarn guide arm 21 is pivoted toward the left stop pin 33 and is stopped by it. On the other hand, for instance because of a knot in the yarn 17 that cannot pass through the yarn eye 19, if the yarn guide arm 21 is pulled to the right as seen in FIG. 1 then its movement is limited by the right stop pin 34.

An eccentric switch control element 35 is located on the shaft 20 of the yarn guide arm 21 in the lower housing portion 24, arranged such that it is secured to rotate with the shaft 20; the switch control element 35 cooperates with a switch 36 accommodated in the housing 1 in such a manner that via corresponding indexing cams of the eccentric switch control element 35, the switch 36, which thus forms a position sensor, is actuated and emits a shutoff signal for the machine before the yarn guide arm 21 comes to rest on the left or right stop pin 33 or 34. A signal light 38 located in a colored luminescent portion 37 on the underside of the housing 1 lights up when either the run-on yarn sensor 22 responds or the switch 36 is actuated and accordingly a shutoff signal for the machine has been emitted. The malfunction can be quickly localized in this way in the circular knitting machine.

An externally actuatable potentiometer 39 (see FIG. 1) is located in the housing 1 in a control circuit, to be explained in detail below, of the direct current motor 25. The potentiometer enables adjustment of the command force exerted by the motor on the yarn guide arm 21 and hence of the yarn tension. A master switch 40 is also provided above the potentiometer 39 in the housing 1, enabling switching on and off of the total current supply to the supply apparatus in such a way that in the shutoff state the entire apparatus is without current, in which case a machine stopping signal cannot be emitted by the switch or the run-on sensor 22 either. An indicator light 41 indicates the operational readiness of the yarn supply apparatus when the master switch 40 is on, while a pushbutton 42 provided in the same housing wall enables manual spooling of the yarn wheel 5 or automatic spooling on of a precise number of yarn windings of the yarn store 190.

Figure 3:
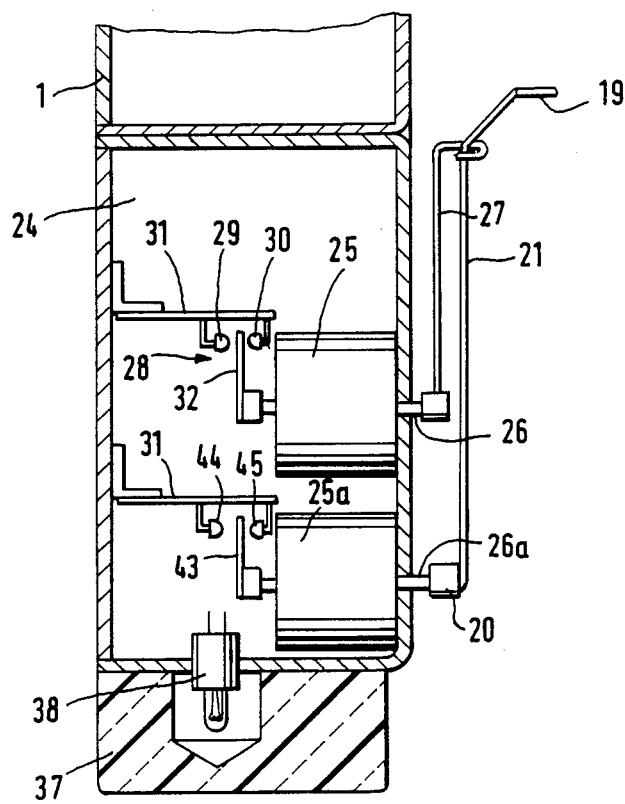
FIG. 3 is a fragmentary view of another embodiment of the yarn supply apparatus of FIG. 1, in a sectional view similar to FIG. 2.

The embodiment of FIG. 3 differs from the embodiment described above in conjunction with FIGS. 1 and 2 only in that both the operating lever 27 and the yarn guide arm 21 are each coupled with a respective permanent magnet field direct voltage motor 25 or 25a, or some other electromagnetic command tranducer of equivalent function, so that the command force that counteracts the yarn tension force engaging the yarn eye 19 is brought to bear by both of these direct current motors 25, 25a. This has the advantage for certain applications that instead of a relatively large motor, two smaller motors can simply be used. The signal transducer 28 is again mounted on the shaft 26 of the direct current motor 25 coupled to the operating lever 27; its structure has already been explained in connection with Fig. 2, and identical elements are identified by the same reference numerals. Instead of the eccentric switch control element 35 and the switch 36 of FIG. 2, in this case a contact-less limit portion sensor is associated with the yarn guide arm 21. This limit portion sensor comprises a suitably embodied dimmer plate 43 mounted on the shaft 26a and a light gate 44, and as a function of the angular position of the yarn guide arm 21 the dimmer plate 43 enters to a variable extent in the beam path of the light gate 44. The phototransistor 45 of the light gate 44 emits shutoff signals when the yarn guide arm 21 reaches limit positions in the vicinity of the two stop pins 33, 34.

Figure 4:
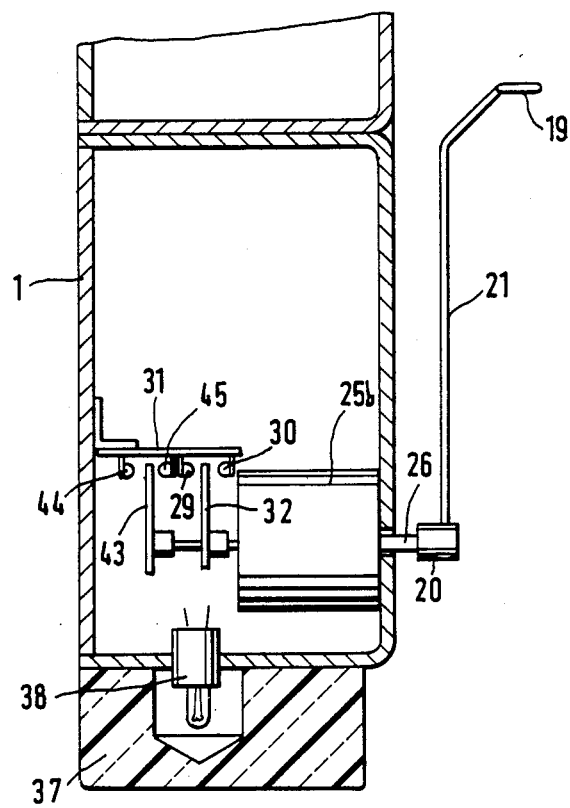
FIG. 4 is a fragmentary view of still another embodiment of the yarn supply apparatus of FIG. 1, again in a sectional view similar to FIG. 2.

The embodiment of FIG. 4 is also substantially equivalent to that of FIGS. 1, 2, but with the distinction that instead of the eccentric switch control element 35 and the switch 36, the contact-less electro-optical limit position sensor 43–45 of the embodiment according to FIG. 3 is provided, its dimmer plate 43 being connected directly to the shaft 26 of the direct current motor 25b which is coupled directly to the yarn guide arm 21. In this case the operating lever 27 is unnecessary.

Figure 7:
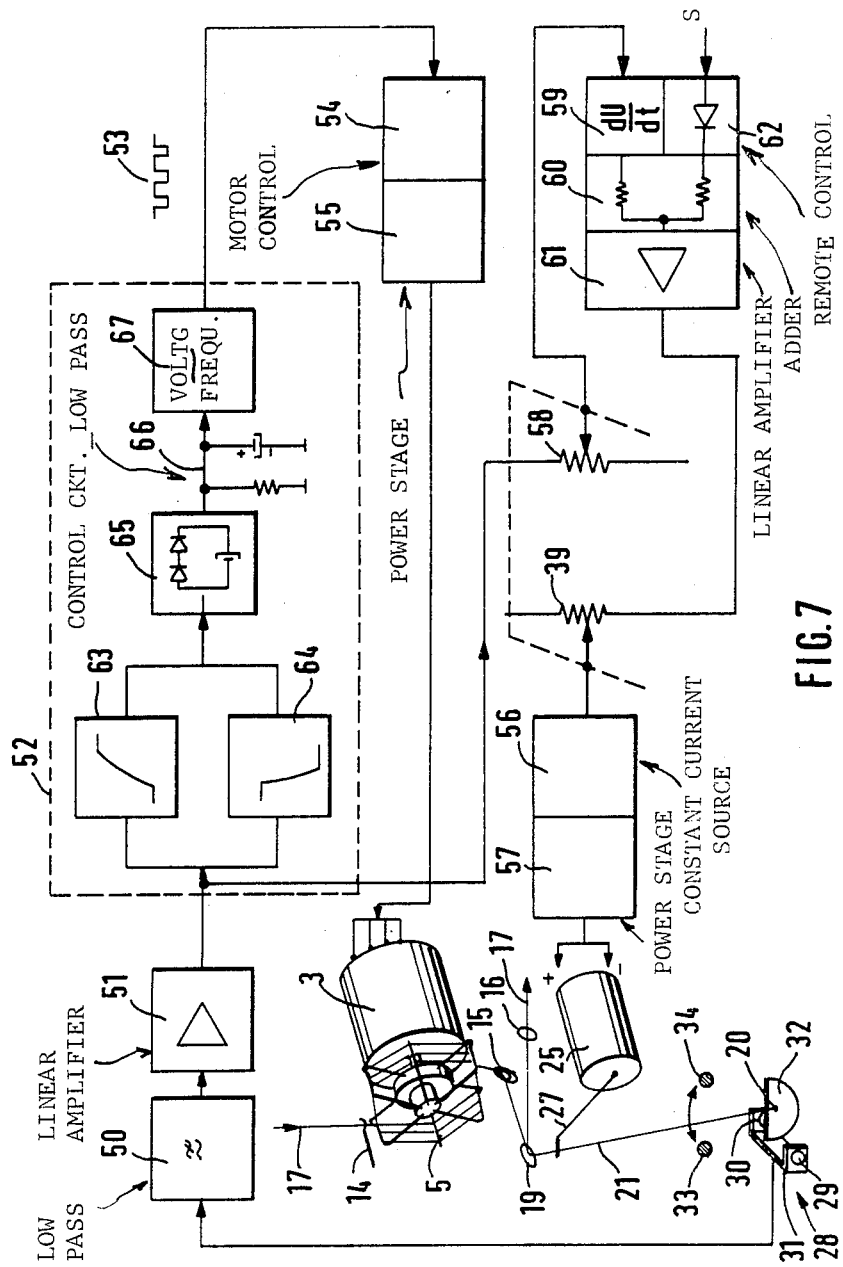
FIG. 7 is a schematic block circuit diagram of the electronic devices in the yarn supply apparatus of FIG. 1.
Figure 8:
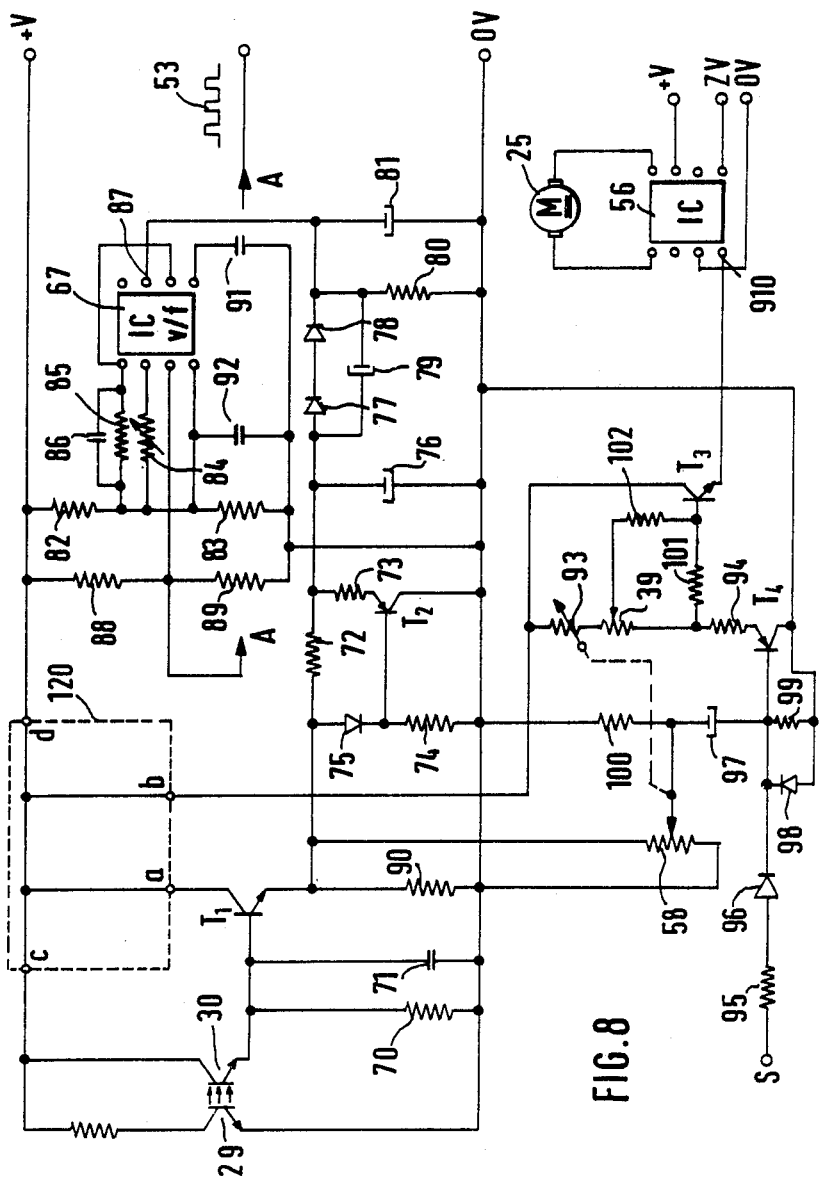
FIG. 8 is a simplified circuit diagram of the circuit for the block circuit diagram of FIG. 7.

The electric circuit for the stepping motor 3 driving the yarn wheel 5 and for the direct current motor 25 acting as the command transducer is shown in FIGS. 7, 8.

As the block circuit diagram of FIG. 7 shows, the analog signal emitted by the phototransistor 30 of the signal transducer 28, which is representative of the angular position of the yarn guide arm 21—and hence of the size of the yarn reserve—as well as for the tension of the yarn 17 passing through the yarn reserve, is fed via a low-pass filter 50 and a linear amplifier 51 into a control circuit 52, which processes the signal and on the output side generates a frequency signal having a specific pulse repetition frequency, which is indicated at 53 and is carried to a motor control electronic circuit 54. Via a power stage 55 connected to its output, this circuit 54 supplies the stepping motor with a position signal in the form of a corresponding incremental pulse train.

Figure 9:
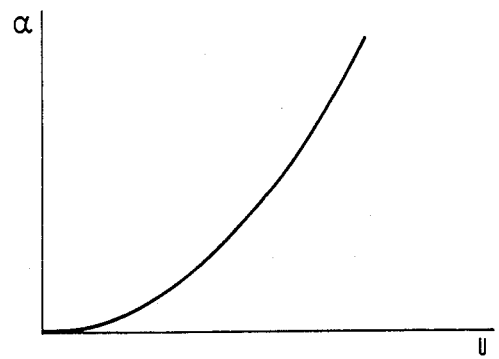
FIG. 9 is a diagram explaining the functional relationship between the positioning angle of the yarn guide arm and of the signal voltage emitted by the electro-optical signal transducer in the yarn supply apparatus of FIG. 1.

The low-pass filter 50 filters the higher-frequency disturbance, originating for example in mechanical vibrations of the yarn guide arm 21, and so forth, out of the analog signal arriving from the signal transducer 28. The linear amplifier 51 on its output side, having a relatively low output impedance, furnishes a signal voltage potential that is dependent on the particular angular position alpha of the yarn guide arm 21. The functional dependency of the signal voltage potential U supplied to the input of the control circuit 52 on the angular position of the yarn guide arm 21, defined by the specialized shape of the dimmer plate 32, is shown in FIG. 9; as already noted, it is in accordance with an approximately exponential function; as a result, the characteristic curve is progressive, so that with increasing yarn supply quantity per unit of time the required positioning angle range of the yarn guide arm 21 will not become excessive.

The permanent magnet field direct current motor 25 acting as a command transducer is supplied with constant current by a constant current source 56 via a power stage 57, so that at its shaft 26 it puts out a constant torque, regardless of the angular position of the operating lever 27. The magnitude of this torque and thus the command value of the yarn tension can be adjusted by the aforementioned potentiometer 39.

The analog voltage signal emitted by the linear amplifier 51 is carried via a second potentiometer 58 coupled to the potentiometer 39 to a differentiator 59, where it is differentiated. The output of the differentiator 59 is connected via an adding element 60 and a linear amplifier 61 to the potentiometer 39, or in other words to the control input of the constant current source 56. In this manner a compensation signal is imposed on the control input of the constant current source 56, and this signal becomes effective in particular at a yarn tension command value that is set to a relatively low yarn tension, less than about 3 p (pond), and temporarily varies the torque exerted by the direct current motor 25 on the operating lever 27, in the event of an abrupt control deviation, so as to return the yarn guide arm 21 to the command angular position; 1 p (pond) corresponds to 1 gramforce or 10 millinewtons.

Via a decoupling element 62 and the adding element 60 as well as the linear amplifier 61, finally, an external positioning signal from an external signal source, or remote control terminal S, such as a central control system for all yarn supply apparatuses, or a certain number thereof, in one circular knitting machine, can be supplied via the potentiometer 39 to the control input of the constant current source 56. This signal allows remote control of the torque of the motor 25 and hence of the command force exerted upon the yarn guide arm 21.

BASIC OPERATION

(1) Steady State Operating Condition

In steady state operation, the stepping motor 3 drives the yarn wheel 5 at a speed determined by the frequency signal 53, so that the yarn 17 is supplied to the utilization station at a corresponding speed. The yarn guide arm 21 is at a particular angular position between the two stop pins 33, 34; the force exerted upon it via the yarn eye 19 by the travelling thread 17 is in balance with the command force engaging it via the operating lever 27 and generated by the direct current motor 25.

In the event of a control deviation, such as a decreasing utilization of yarn, the yarn guide arm 21 begins to migrate from its command angular position, so that the analog voltage signal $U+\Delta U$ supplied to the control circuit 52 undergoes a corresponding variation. The control circuit 52 regulates the control signal 53 for the stepping motor 3 and hence the yarn supply speed accordingly, until a steady state has again been attained, in which the yarn guide arm 21 assumes a fixed angular position in which the yarn tension is in balance with the command force exerted by the operating lever 27. Because the command force is constant, regardless of the angular position of the operating lever 27 and yarn guide lever 21, then in steady operation the yarn tension is constant within the regulated range no matter what the yarn supply speed and thus no matter what the yarn utilization per unit of time.

(2) Transient Operating Conditions

Figure 5:
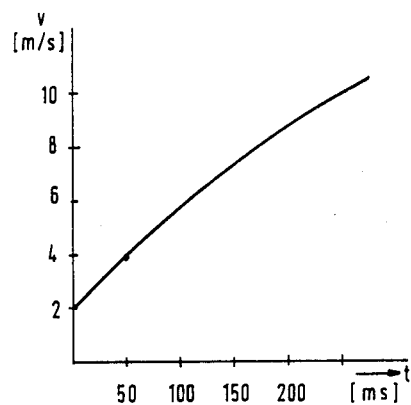
FIG. 5 is a diagram showing the startup characteristic of the motor and of the yarn wheel of the yarn supply apparatus of FIG. 1.
Figure 6:
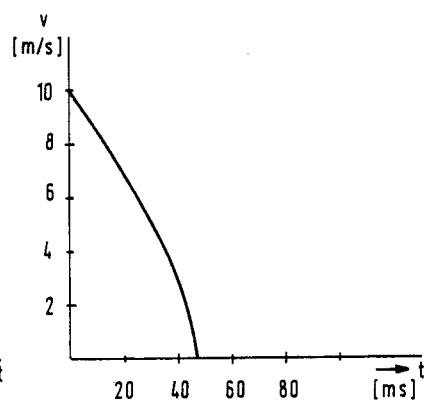
FIG. 6 is a diagram showing the discontinuance characteristic of the motor and of the yarn wheel of the yarn supply apparatus of FIG. 1.

In the event of a very fast, abrupt change in the yarn utilization, such as arises in a circular knitting machine operating in striping operation whenever the striping apparatus makes a change of yarn, the stepping motor 3 along with the yarn wheel coupled to it and the yarn 17 travelling on it is too sluggish to follow up the quick course of the regulation process. Then in the striping operation mentioned above, for example, when a new yarn is inserted, the previously stopped yarn must be accelerated to the normal yarn supply quantity of approximately 4 m/sec within a fraction of a millisecond. However, the stepping motor 3 can follow up a change (increase) in frequency of the control signal 53 only within certain limits, which are set by the startup characteristic. FIGS. 5 and 6 show the startup and discontinuance characteristics of the stepping motor 3 in a typical embodiment of the yarn supply apparatus described. As FIG. 5 shows, the stepping motor 3 requires at least about 50 ms to reach a circumferential speed of 4 m/sec at the yarn wheel 5. If an attempt were made to accelerate it faster, it would fall out of step with the frequency signal 53 and come to a stop.

Since a stepping motor is known to have a certain starting/stopping frequency, the characteristic curve in FIG. 5 does not pass through the zero point.

The same is fundamentally true of the conditions when the yarn supply is brought to a stop; once again, this operation can take place only within the range below the discontinuance characteristic shown in FIG. 6, unless the stepping motor 3 is to fall out of step with the frequency signal 53.

In accordance with the invention, the above-described inertia of the unit comprising the stepping motor and its control means, in the event of a very rapid increase in yarn utilization (for example when a yarn is inserted into the striping apparatus) is prevented from increasing the yarn tension on the run-off side of the yarn wheel 5 impermissibly (or even breaking the yarn), and on the other hand, in the event of a sudden interruption of yarn removal the yarn wheel 5 that is slowly coming to a stop with the stepping motor 3 is prevented from continuing to supply excess yarn, causing loops to form and resulting in the breakdown of the yarn tension. Hence, in the actuation of the machine stop switch 36, the following provisions are made:

In accordance with a feature of the invention, a yarn reserve is provided, as already noted, between the fixed yarn eyes 15, 16 and the movable yarn eye 19. The size of this yarn reserve is dimensioned such that it is adequate to meet the yarn requirement during the startup time of the stepping motor, which is defined by its start up characteristic (FIG. 5). This size can be calculated in a simple manner using the known startup characteristic and the equally-known yarn requirement during the startup phase; by a suitable selection of the length of the yarn guide arm 21 and the size of its positioning angle range, the yarn supply apparatus can be adjusted for this.

Also provided in the control circuit 52 is a circuit arrangement essentially comprising two integrators 63, 64, which has a time constant adapted to the particular startup or discontinuance characteristic (FIGS. 5, 6) of the stepping motor 3 and hence controls and limits the variation over time of the frequency of the frequency signal 53 during startup or discontinuance of the stepping motor 3, in such a way that the stepping motor 3 loaded by the yarn 17 and the yarn wheel 5, etc., is capable of following up the change in frequency. In practical terms, this means that the startup and discontinuation curves of the stepping motor 3 controlled by the frequency signal 53 are located below the startup and discontinuance characteristics shown in FIGS. 5 and 6, respectively.

It is thus attained that during the startup time of the stepping motor 3 the utilization station can meet its yarn requirement from the yarn reserve, and the yarn tension always remains at its command value as a result of the command torque of the direct current motor 25, which is not dependent on the positioning angle. At the same time, during this time the stepping motor 3 can accelerate the yarn wheel 5 to the speed corresponding to the required yarn travel speed within a period of time the length of which is determined by the startup characteristic and which assures that the stepping motor 3 will remain in step with the frequency signal 53.

Since the signal transducer 28 senses the angular position of the yarn guide arm 21, then with increasing speed of the stepping motor 3 and thus an increasing quantity of yarn supplied per unit of time by the yarn wheel 5, the yarn guide arm 21 is automatically moved by the operating lever 27, likewise to an increasing extent, to an angular position that corresponds to steady state operation, in which the quantity of yarn supplied by the yarn wheel 5 corresponds exactly to the yarn utilization. Once this steady state is attained, the yarn guide arm 21 is again in an intermediate position, determined by the particular yarn supply speed, between the stop pins 33, 34; that is, the yarn reserve has again been built up to an initial value.

In principle the same takes place in the event of a sudden interruption in yarn supply. In this case, yarn utilization begins to decrease suddenly; the yarn guide arm 21 is pivoted increasingly far by the operating lever 27, so that the quantity of yarn no longer removed is stored in the yarn reserve. At the same time the signal transducer 28 emits the signal representative of this pivoting of the yarn guide arm 21; the control circuit 52 varies the frequency of the frequency signal 53 so as to stop the stepping motor, but the speed of the change in frequency is limited by the integrator 64 to a value that is below the discontinuance characteristic of FIG. 6, so that until it comes to a stop the stepping motor 3 follows up the change in frequency of the frequency signal 53 exactly.

Since on discontinuance of the stepping motor 3 and the elements coupled with it the moment of friction acts to provide supplementary braking, which is expressed in the difference between the discontinuance characteristic and the startup characteristic, the time constant of the integrator 64 associated with the discontinuance of the stepping motor 3 is less than that of the integrator 63 associated with the startup of the motor. The ratio of the two time constants is typically less than about 4:1.

The circuit arrangement formed of the integrators 63, 64 is followed by a diode circuit 65, the output of which is connected via a low-pass filter 66 with a voltage/frequency converter 67, which furnishes the frequency signal 53. The diode circuit 65 forms a threshold circuit, which prevents signal voltages that are below a lower threshold value from being supplied to the voltage/frequency converter 67; such voltages would cause the temporary emission of a frequency signal having an impermissibly low frequency for the stepping motor 3. The low-pass filter 66 prevents malfunctions of the voltage/frequency converter 67.

For the aforementioned reasons, the voltage/frequency converter 67 is provided on its output side with a null-point suppression. The steepness of its characteristic curve can also be varied, so as to enable adjustment of the angular position of the yarn guide arm 21 and hence of the sides of the yarn reserve in a manner suitablw for a particular steady yarn travel speed.

The circuit corresponding to the block circuit diagram of FIG. 7 is shown in detail in FIG. 8, and the ensuing description is limited to its essential features.

Connected to the output side of the phototransistor 30 of the signal transducer 28, via the low-pass filter 50 formed by the resistor 70 and the capacitor 71, is a transistor $T_1$ in an emitter follower circuit having an emitter resistor 90, which forms the linear amplifier, i.e. a voltage follower, 51. Connected to the emitter of the transistor $T_1$ is a resistor 72, to which a second resistor 73 is connected, which is located in the emitter circuit of a transistor $T_2$, the base of which is connected to ground or chassis via a resistor 74 and to the emitter of the transistor $T_1$ via a diode 75. Connected parallel to the transistor $T_2$ is a capacitor 76.

Together with the resistor 72, the capacitor 76 essentially forms the integrator 63 associated with the startup of the motor; its time constant is 100 ms, for example.

If upon discontinuance of the stepping motor 3, because of the corresponding migration of the yarn guide arm 21, the voltage signal emitted at the emitter of the transistor $T_1$ becomes negative with respect to the voltage potential present at the capacitor 76, then the transistor $T_2$ connected as an emitter follower connects the resistor 73 parallel to the resistor 72 and to the capacitor 76. Hence the transistor $T_2$ acts as a switch for switching the resistor 73 parallel to the resistor 72 on or off.

The capacitor 76 is followed by the diode circuit 65, formed by the two diodes 77, 78, which are bridged by a capacitor 79. By means of the diodes 77, 78 the flat course of the discharging curve of the capacitor 76 is suppressed in the lower voltage portion. In order to attain immediate responce of the voltage/frequency converter 67 as the stepping motor 3 starts up, the two diodes 77, 78 are bridged by the capacitor 79, which is dimensioned such that it is effective only when abrupt changes in voltage occur.

The discontinuance time constant of the integrator 64 formed by the resistors 72, 73 and its capacitor 76 amounts to approximately one-fourth of the time constant of the integrator 63 associated with the startup, which as noted is formed by the resistor 72 and the capacitor 76. Because of the diode circuit 65, only approximately two to three discontinuance time constants are required until the stepping motor 3 is completely shut off.

The diode circuit 65 is followed by the filter 66, comprising a resistor 80 and a capacitor 81, and the filter 66 is followed on the output side by the voltage/frequency converter 67, e.g., of the type 4151/IC$_1$.

The voltage/frequency converter 67, formed by an integrated circuit, is negatively biased to a predetermined voltage (about 50 mV) at its corresponding control input via a voltage divider 82, 83. By means of this null-point suppression it is attained that in the limit position of the yarn guide arm 21, it is certain that no pulses, that is, no frequency signal 53, wil be emitted.

Otherwise the voltage/frequency converter 67 generates a frequency signal 53 the pulse repetition frequency of which is directly proportional to the voltage potential of the input signal. The steepness of the voltage/frequency converter 67 can be varied by means of a potentiometer 84. In this way, stationary or respose position of the yarn guide arm 21 in the region between the stop pins 33, 34 can be associated with a specific yarn travel speed. By means of an external resistor 85, which is bridged by a capacitor 86, the maximum pulse frequency of the frequency signal 53 is set in such a way that at the terminal position of the yarn guide arm 21 assumed at the maximum yarn supply quantity per unit of time, and hence at the maximum signal voltage at the input 87 of the voltage/frequency converter 67, there is a yarn supply quanity of about 10 m/sec, for example.

The resistors 88, 89 and the capacitors 90, 91 are simply part of the operational wiring of the integrated circuit forming the voltage/frequency converter 67 and therefore need no further explanation.

The direct current motor 25 exerting the command force upon the yarn guide lever 21 has a permanent magnetic field and is supplied with constant current by the constant current source 56, which in turn is once again formed by an integrated circuit of the type PPL 4717, which at the same time also contains the power stage 57. Via a voltage signal to an input 91 of this integrated circuit, the motor current and hence the torque exerted by the motor 25 can be adjusted exactly to any particular desired value. The signal voltage required for this purpose is picked up at the wiper of the adjusting potentiometer 39 and supplied to the input 91 via an emitter follower formed by a transistor $T_3$. The adjustment range is predetermined at the upper end by means of a potentiometer 93 and at the lower end via an emitter follower formed by a transistor $T_4$ and an emitter resistor 94, the emitter follower forming the linear amplifier 61 along with the adding element 60 (see FIG. 7).

Either a remote control signal S can be sent to the base of the transistor $T_4$, via the dividing element 62 comprising a resistor 95 and a following diode 96, by means of which signal the voltage value adjusted with the potentiometer 39 is varied, or a compensation signal is imposed at this point, which originates in the differentiator 59. The differentiator 59 substantially comprises a capacitor 97 and a resistor 99 bridged by a diode 98. The adjustment of the compensation signal is effected via the potentiometer 58, to which the analog signal appearing at the output of the linear amplifier 51 formed by the transistor $T_1$ with the following emitter resistor 90 is supplied. The wipers of the two potentiometers 58, 93 are coupled to one another. This imposition of a compensation signal is adapted to the physical properties of the entire yarn guide arm mechanism, including the direct current motor 25, in such a way that it preferably becomes effective only at relatively low yarn tension settings (less than or equal to 3 p). This is attained in particular by suitable design of the potentiometer 58 and of an associated resistor 100. Resistors 101 and 102 provide for approximate linearization of the adjustment range. The diode 98 prevents a negative voltage flank from lowering the motor current value that has been sent. The diode 96 of the dividing element 62 has the effect that the motor current value set at the potentiometer 39 can be increased only, but cannot be decreased.

The embodiment described above of the yarn supply apparatus is autonomous; that is, without synchronization with an external yarn supplied is always kept at a predetermined command value of the yarn utilization, and within the operating range every yarn quantity needed is positively furnished.

By means of simple expansion of the electrical circuit, as illustrated in FIG. 10, yarn supply apparatus can also be triggered by an external synchronization signal, for example supplied by a central rotary pulse transducer of the circular knitting machine, in such a way that the yarn supply quantity is synchronized with this synchronizing signal. The mode of operation is significant for example in high-speed striping machines, sock knitting machines, and so forth, in which the knitting speed and the resultant yarn supply speed are above a lower value that is predetermined by the starting/stopping frequency of the particular stepping motor 3 involved.

Since the yarn supply apparatus, because of the embodiment described, is able to follow up extreme changes in the yarn supply quantity upon a change of yarn resulting from temporary emptying or filling of the yarn store, the yarn supply apparatus is inherently highly suitable for such machines. Once the yarn wheel 5 and the stepping motor 3 have run up to speed following a yarn change, a positive yarn supply takes place, so as to assure an absolutely uniform goods production. The switchover of the yarn supply apparatus from the autonomous operation mentioned above during the startup process to the positive mode of operation in synchronization with an external synchronizing signal takes place automatically, so that no additional external means, such as separate control pulses and the like, are required for this purpose.

In FIG. 10, the portions of the block circuit diagram of FIG. 7 that are necessary for comprehension are identified by the same reference numerals; they are not described in further detail.

In accordance with this feature of the invention, an electronic switch 105, which permits selective supplying of the frequency signal 53 emitted by the control circuit 52 (autonomous operation) or of a synchronizing frequency signal 107, supplied via an input 106 by an external synchronization source, is located between the output of the control circuit 52 and the triggering electronic circuit 54 of the stepping motor 3. For triggering the electronic switch 105, a control circuit 108 is used, which includes a frequency/voltage converter 109, an adjusting potentiometer 110 and a comparator 111 that has a certain hysteresis. The frequency/voltage converter 109 converts the external synchronizing frequency signal 107 into an analog voltage, which is applied via a resistor 112 to the adjusting potentiometer 110, which on the other side, via a resistor 113, receives the analog signal at the output of the integrators 63, 64. The comparator 111 compares the two voltages and emits a switchover signal to the electronic switch 105, if the voltages are equal, i.e., when the frequency of pulses applied to the motor 3 by the circuit 52 has reached the frequency of the pulses 107. The adjusting potentiometer 110 allows adjustment of the switchover level.

OPERATION, FIG. 10

Once the startup process of the stepping motor 3 has ended, the yarn guide arm 21 assumes the position corresponding to the particular yarn travel speed in steady state operation, so that the analog signal picked up at the output of the integrators 63, 64 also has a certain magnitude. By comparison of this magnitude with the analog voltage corresponding to the external synchronizing frequency signal 107, the comparator 111 automatically recognizes the termination of the startup process of the motor 3, whereupon it emits the signal for switchover from autonomous operation to positive operation. The situation is equivalent for switching the electronic switch 105 back, for example, when the yarn is removed by the striping apparatus.

If the takeup of yarn from the yarn wheel 5 is interrupted, for example when the yarn is removed by the striping apparatus, then the yarn guide arm 21 is pivoted by the motor 25 via the operating lever 27 initially to the stop position shown on the left in FIG. 7. In this process the stepping motor 3 is acted upon as already explained via the control circuit 52 by the position-dependent signal emitted by the signal transducer 28, in such a way that the motor reduces its speed and hence the quantity of yarn supplied per unit of time. As soon as the yarn guide 21, within its path of motion limited by the two stop pins 33, 34, enters a certain zone, or range, in the direction toward the left stop pin 33, known as the stop-motion range, the stepping motor 3 is stopped. The yarn guide arm 21 does not come to a standstill instantaneously, however, but instead, having its own systemic inertia, travels on into the stop-motion range until, first, the stepping motor 3 has in fact come to a stop, and, second, the yarn travelling through the eye 19 has once again been made taut by the yarn guide arm 21 in response to the command force imposed by the direct current motor 25, thus preventing further motion of the yarn guide arm 21. The yarn that is firmly held by the yarn clamp of the striping apparatus on the utilization side is held on the other side by the retaining torque of the stepping motor 3; it is kept at the command tension adjusted at the potentiometer 39 by means of the yarn guide arm 21 and the direct current motor 25. Particularly at relatively high yarn tension command values, there is the danger that the removed yarn will be drawn out of the yarn clamp slowly, with the result that operation will be interrupted the next time yarn is inserted. Even if the circular knitting machine is shut down for a relatively long period, for instance overnight, the fact that this yarn tension is maintained can cause problems, for example by unfavorably affecting the loop pattern in the last row of loops. This problem arises particularly when rubber yarns having a yarn tension of more than 3 p (30 mN) are processed.

Figure 11:
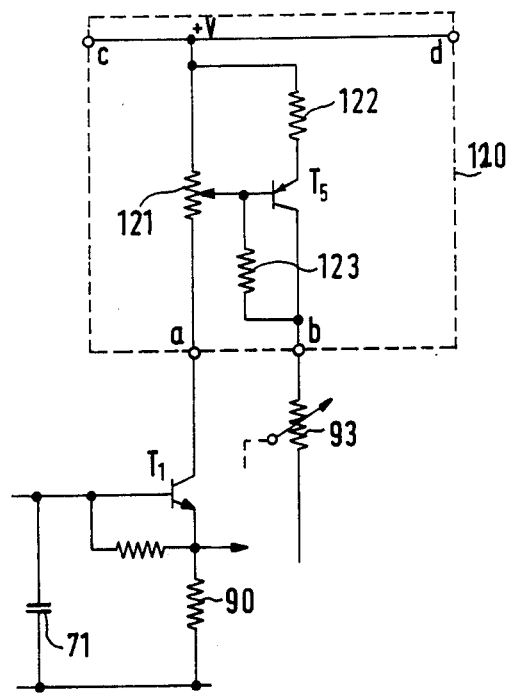
FIG. 11 is a circuit diagram of a circuit portion serving the purpose of reducing yarn tension for the circuit of FIG. 8.

A slight modification of the control circuit 52 as shown in FIG. 11 avoids yarn loss.

The voltage portion 120 shown in FIG. 11 can be selectively incorporated into the circuit of FIG. 8, instead of the circuit portion 120 shown in dashed lines in FIG. 8. Corresponding connection points are indicated by the letters a–d.

In the voltage portion 120, an adjusting potentiometer 121 is located in the collector circuit of the transistor $T_1$. The analog signal arriving from the phototransistor 30, which is representative of the position of the yarn guide arm 21, is practically rotated by 180° in the collector circuit of the transistor $T_1$ and supplied via the wiper of the adjusting potentiometer 121 to the base of a p-n-p transistor $T_5$, which substantially operates as a switching amplifier. Located in the emitter circuit of the transistor $T_5$ is an emitter resistor (approximately 560 ohms), while the collector of the transistor is connected to the base via a negative feedback resistor 123. Also located in the collector circuit of the transistor $T_5$, via the connection point b, are the potentiometer 93 (FIG. 8) and the switching elements connected to the output side thereof.

OPERATION—FIG. 11, AND WITH REFERENCE TO FIG. 12

The negative feedback from the collector to the base of the transistor $T_5$ (FIG. 11) generated by the negative feedback resistor 123 prevents an abrupt changeover of the collector potential upon reaching a certain voltage potential at the base. The transition takes place without hysteresis and smoothly, as long as the motion of the yarn guide arm 21 proceeds smoothly. At the same time the resistor 123 (approximately 100 kohms) serves to adjust the lowermost value of the yarn tension imposed on the yarn by the yarn guide arm 21 when the stepping motor 3 is at a standstill.

Once the yarn guide arm 21 has pivoted far enough to the left (FIG. 10) that the stepping motor 3 has come to a stop, for example in removing the yarn in a striping operation, or in other words once the yarn guide arm 21 is located in the stop-motion range of its path of motion, the transistor $T_5$ is virtually without current. As a result, however, the two potentiometers 93, 39 now receive only a slight current via the negative feedback resistor 123, which is sufficient to bring about a voltage drop at the base of the transistor $T_3$ such that at its emitter this transistor furnishes a substantially reduced voltage signal to the integrated current forming the constant current source 56, via its input 91. As a result the direct current motor 25 is acted upon by a substantially reduced exciter current, so that the command force exerted on the yarn guide arm 21 by the operating lever 21 is also reduced to an associated lowered value, which for example corresponds to yarn tension of 0.5 p.

Thus, when the yarn wheel 5 is at a stop, the yarn that has been removed and is held at one end by the yarn clamp of the striping apparatus is kept below this relatively low and therefore harmless tension.

As soon as the yarn is reinserted by the striping apparatus, the yarn guide arm 21 begins quickly to migrate toward the right (FIG. 10). The phototransistor 30 emits a corresponding position-dependent analog signal to the transistor $T_1$. When a specific voltage threshold is reached, the transistor $T_5$ becomes completely conductive, so its collector potential approximately attains the value +V, and thus the potentiometers 93, 39 are again at +V, which corresponds to the initial state shown in FIG. 8 and permits full normal function of the adjusting potentiometers 39, 93.

Figure 12:
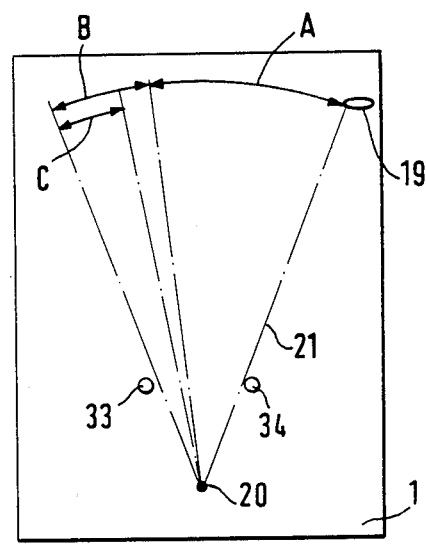
FIG. 12 is a schematic plan view of the yarn guide arm of the yarn supply apparatus of FIG. 1, showing the various regions within the path of motion of this yarn guide arm.

With the above-described function of the voltage portion 120, the resultant mode of operation of the yarn supply apparatus is that shown schematically in FIG. 12:

The path of motion, limited by the two stop pins 33, 34, of the yarn guide arm 21 that is pivotable about the horizontal shaft 20 corresponds to a path of motion located on a circular arc of the associated yarn eye 19. The total path of motion is divided up into a plurality of ranges, as follows:

If the yarn guide arm 21 is inside the first range A, which is adjacent to the right-hand stop pin 34, then it is located within the normal working range or sector, in which the command force adjusted at the potentiometer 39 is imposed on the yarn guided through the eye 19, so that the yarn is held with a corresponding constant yarn tension. The yarn reserve is at its original size; the particular position of the yarn guide arm 21 within the range A depends on the yarn travel speed and thus on the required speed of the stepping motor 3.

Adjoining the first zone or working range A and extending as far as the left-hand stop pin 33 is a second zone, or stop-motion range or sector B. As soon as the yarn guide arm 21 crosses the boundary between the two ranges A and B, for example upon termination of stripe insertion of the yarn by the striping apparatus, the stepping motor 3 is shut off. It comes to a standstill within the time determined by its discontinuance characteristic, as has been described in detail in the description of the control circuit 52.

By means of the above-described function of the voltage portion 120, the stop-motion range B is subdivided further, into a third zone or sub-range C, in which the yarn tension is lowered, and a remaining zone or sub-range B—C, in which the command yarn tension set in working range A is also maintained.

Thus whenever the yarn is removed abruptly, for example, in striping at a relatively high yarn speed, the yarn guide arm 21, with its inherent inertia, moves into the stop-motion range B until the stepping motor 3 has come to a stop and the yarn is once again taut, which prevents further motion of the yarn guide arm 21. The exact position or "intrusion depth" that the yarn guide arm attains in the stop-motion range B depends in part on the yarn speed and yarn tension when the yarn removal was interrupted and on how fast the interuption took place. If the yarn guide arm remains in the portion B—C of the stop-motion range B adjoining the working range A, then with the stepping motor 3 stopped the yarn tension remains at the command value adjusted by means of the potentiometer 39, and this value is also applicable for knitting operation.

Now if the knitting machine should be unable to hold the yarn that is at this yarn tension, for instance because the yarn holder or clamp of the striping apparatus yields slightly, then the yarn guide lever 21, under the influence of the command force exerted by the direct current motor 25 via the operating lever 27 travels slowly toward the left-hand stop pin 33. However, as soon as it enters the sub-range C of the stop-motion range B, then the yarn tension is automatically reduced to a substantially lower value, of for instance 0.5 p, by means of the circuit portion 120 by a corresponding reduction of the excitation of the direct current motor 25. In any case this lower value is so small that the tension force exerted by the yarn is harmless. However, it is not zero, and therefore the force must not drop below it, because otherwise the machine shutoff function would be tripped by the switch 36. Because the yarn guide arm 21 thus remains held by the yarn with the stepping motor stopped at some point within the stop-motion sub-range C—although it is held with a substantially reduced imposition of force—it is assured that even with the stepping motor 3 stopped, the yarn is still located in the yarn guide, needle or yarn clamp of the striping apparatus, and so forth, and can continue to be used properly for knitting when operation continues. However, if the yarn guide arm 21 has been pivoted far enough that in the vicinity of the left-hand stop pin 33 it trips an actuation of the switch 36, this means that the yarn was pulled out or torn off; in other words, some operational malfunction is present in any case.

Without such an operational malfunction, the yarn guide arm is returned more or less rapidly, when yarn utilization resumes, from its described position in the stop-motion range B toward the right into the working range A, by moving with only a slight overrun to the applicable stationary speed position for the particular yarn supply speed at that time.

When the knitting machine runs very rapidly up to high yarn speeds or in striping operation at high yarn speed, the switch-on point for the stepping motor 3 shifts toward the left-hand stop pin 33; that is, the yarn supply by the yarn wheel 5 begins earlier, as a function of the yarn speed at the beginning of yarn removal. This is advantageous because as a result, especially at high yarn speeds and low yarn tension, a slight overrun of the yarn guide arm 21 takes place, since the passive yarn reserve that is defined by the yarn guide arm 21 located in the stop-motion range B can be utilized virtually completely. As a result, higher striping speeds are attainable, for instance. Furthermore, if the switch-on point for the stepping motor 3 and the switchover point of the yarn tension from the lowered value of for instance 0.5 p to the operational command value of for instance 5 p are selected, then the first needles of the knitting machine still receive a few centimeters of yarn length at a lower yarn tension, which is advantageous for the beginning of knitting, because it reduces the danger that the yarn will slip out of place. Otherwise the transition from the lower yarn tension value to the operation command value for the yarn tension takes place smoothly—and this also applies in the reverse direction—so that manifestations of shock are prevented.

The yarn supply apparatus described above and shown in terms of its construction particularly in FIGS. 1–4 has the yarn wheel 5 as a yarn supply element, which in forming the yarn store, comprising a number of yarn windings 190, is encompassed several times by the yarn and therefore assures a substantially slip-free drive of the yarn at its circumference, as is explained above. This kind of yarn supply apparatus structure is suitable particularly for supplying standard monofilament yarns or composite fiber yarns that do not have an excessive elasticity.

For highly elastic yarns rubber-cored or bare-rubber yarns and the like, a yarn supply apparatus of a different structure is suitable, but the invention is equally applicable to it. Such yarn supply apparatuses are in principle constructed such that the preferably cylindrical yarn supply spools or yarn winding packages are driven with friction at their circumference, as is described in detail, for example, in the journal "Knitting International", June, 1985, pages 47 ff. In this case the yarn supply element in accordance with the invention is a cylindrical drive roller that can be friction-coupled to the circumference of a yarn draw-off spool or yarn package.

Embodiments of this kind of yarn supply apparatus are shown in FIGS. 13–16, in which elements corresponding to the already-described embodiments of a yarn supply apparatus are identified with the same reference numerals, with prime notation, where applicable, so that they need not be explained again.

Two axially parallel cylindrical rollers 150, 151 are rotatably supported on the housing 1', which again carries the holder 2' and in its upper portion receives the electric stepping motor 3 (FIG. 15), these rollers being aligned horizontally in the operating position of the apparatus. The two rollers 150, 151 form an unwinding station for at least one yarn supply spool 152, the spool core of which is shown at 153 and which rests with its circumferential surface on the two rollers 150, 151. The spacing of the rollers 150, 151 is less than the diameter of the spool core 153, so that when the yarn supply spool 152 is empty the spool core 153 will not drop in between the two rollers 150, 151.

Figure 14:
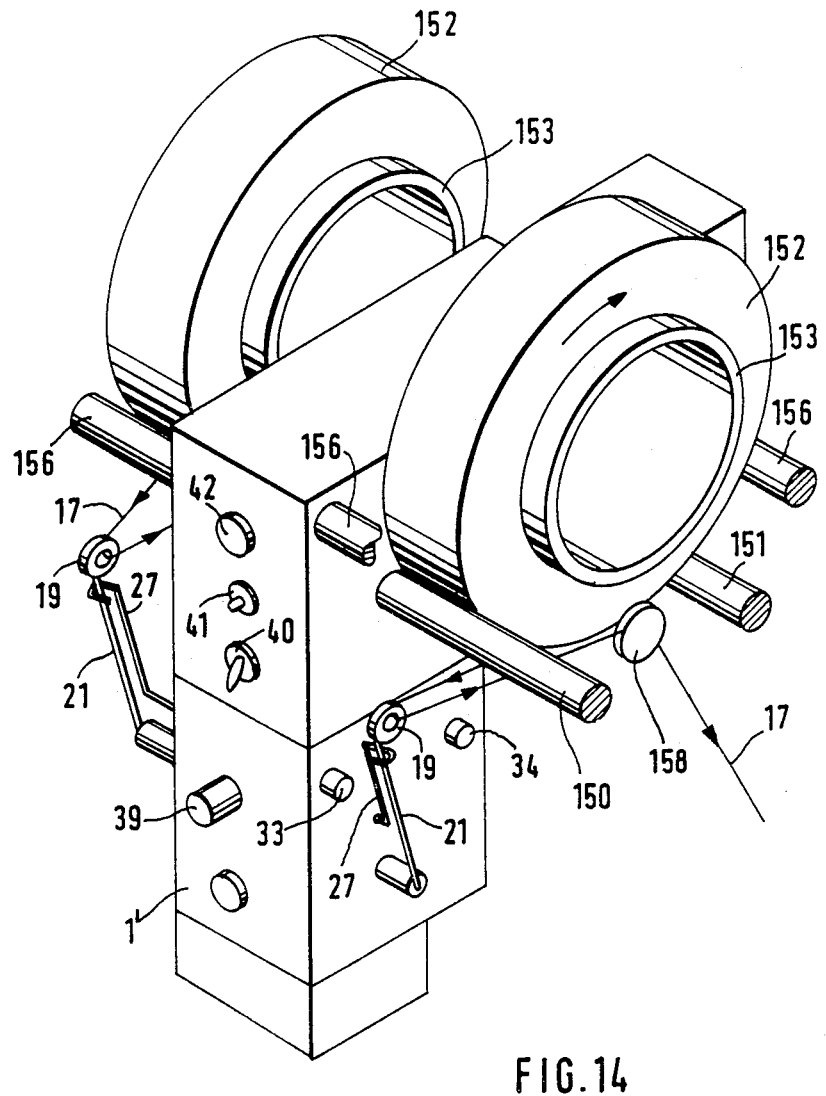
FIG. 14 shows the yarn supply apparatus of FIG. 13 in a modified embodiment, again shown in a schematic perspective view.

The two rollers 150, 151 can be located protruding from only one housing side, as shown in FIG., 13, but if for no other reason than balancing the weight, the arrangement of FIG. 14 is often more suitable, in which the two rollers 150, 151 are rotatably supported, protruding coaxially on both sides, on the substantially rectangular upper portion of the housing 1 defined with parallel flanks, in such a manner that unwinding stations are provided on both sides of the housing. The length of the rollers 150, 151 is selected to correspond to the spool height, but embodiments may also be constructed in which a plurality of yarn supply spools 152, located coaxially besides one another, can be supported on the roller pairs 150, 151. The two rollers 150, 151 are rotatably supported at the end, via roller bearings 154 (FIG. 15), in an end plate 155, which in turn is rigidly connected via struts 156 to the upper portion of the housing 1'.

A yarn guide roller 158 that is freely rotatable about a horizontal shaft 157 is provided for each unwinding station below the two rollers 150, 151; the yarn guide roller forms a fixed yarn guide element and the yarn 17 leaves it to travel to the yarn utilizing station.

Of the two rollers, the roller 151, embodied as a hollow shaft (FIG. 15) is mounted directly on the shaft 4 of the stepping motor 3 such that it rotates with this shaft. It therefore forms a drive roller that is friction-coupled with the circumference of the yarn supply spool 152 supported on the two rollers 150, 151. The other roller 151 is merely rotatably supported on the upper portion of the housing 1.

Figure 16:
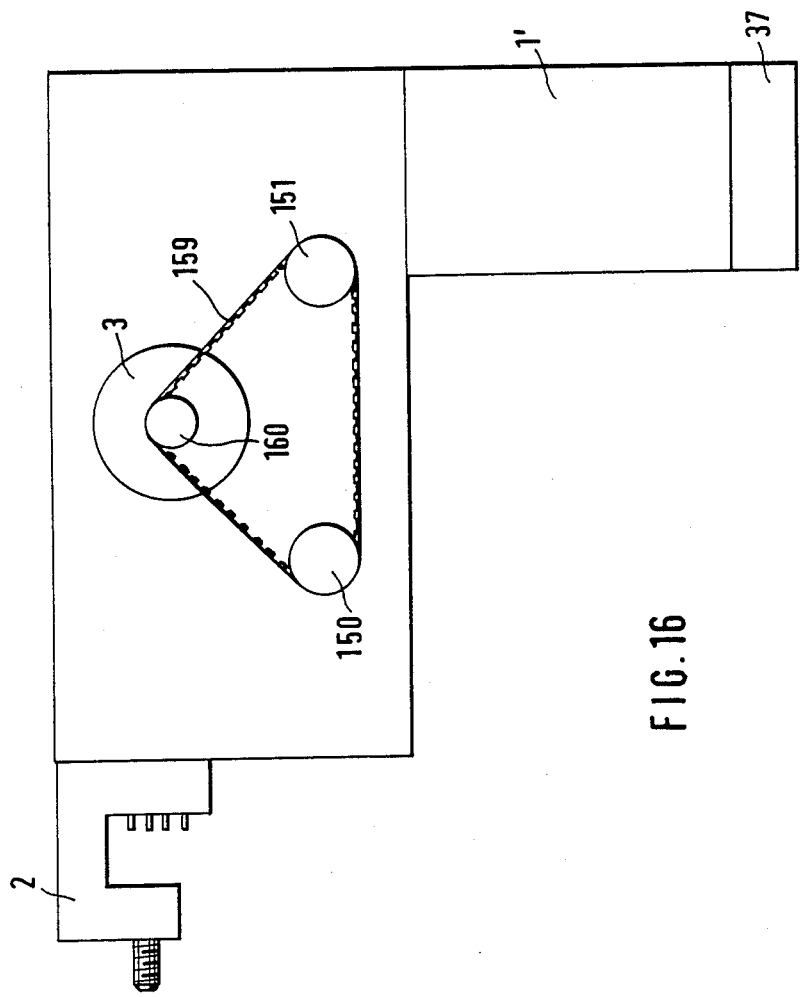
FIG. 16 shows the yarn supply apparatus of FIG. 13 or 14 in an axial section, taken in side view, schematically showing an embodiment of the drive means for the drive rollers.

In principle, however, both rollers 150, 151 can act as drive rollers, as shown schematically in FIG. 16. In this case the two rollers 150, 151 are positively coupled together for being driven via an endless toothed belt 159 and toothed belt pulleys mounted on the rollers so as to rotate with them, with a toothed belt pulley 160 secured on the shaft of the stepping motor 3. The toothed belt 159 is accommodated in the upper portion of the housing 1. It assures compulsory synchronization of the rotational movements of the two rollers 150, 151 with one another and with the rotational movement of the stepping motor 3, in such a manner that the circumferential speed of the two rollers 150, 151 is always equal.

Figure 13:
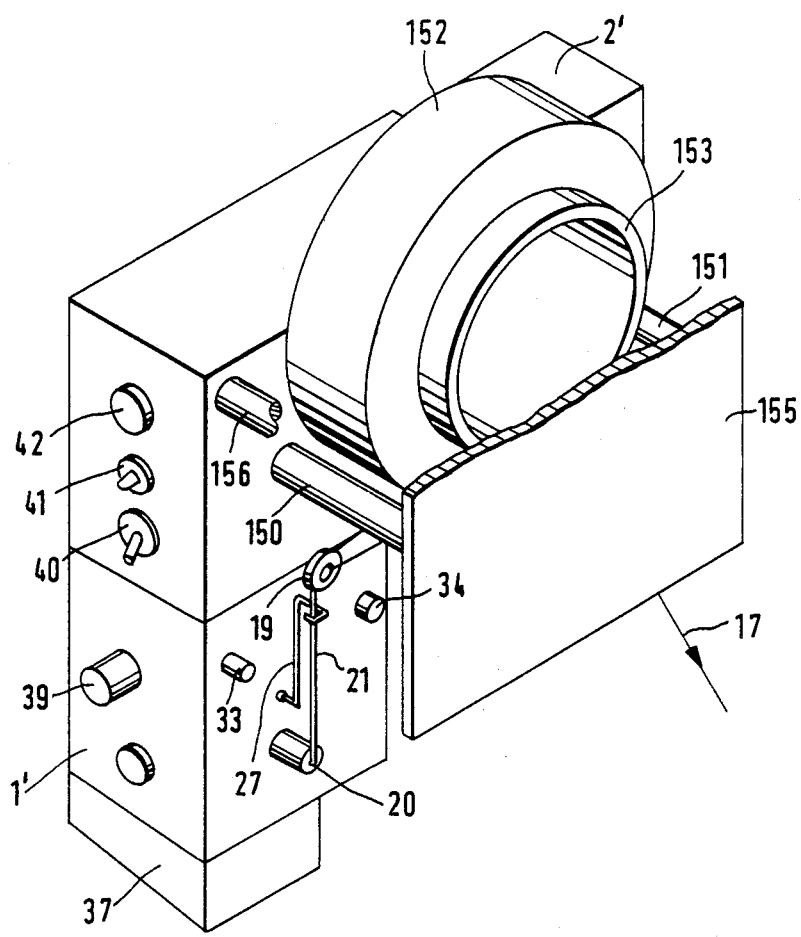
FIG. 13 shows another embodiment of a yarn supply apparatus according to the invention intended in particular for reeling off highly elastic yarns, seen in a schematic perspective view.
Figure 15:
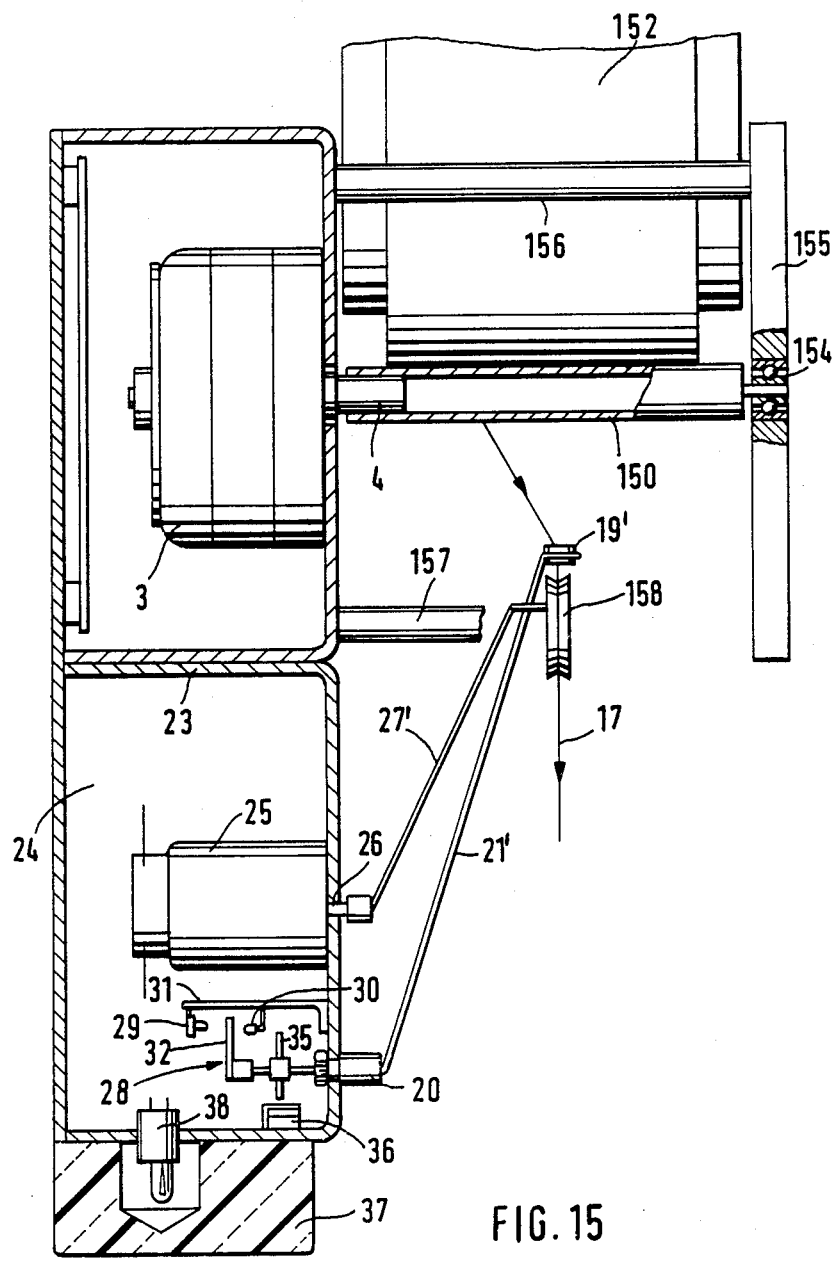
FIG. 15 is an axial section in side view and on a different scale, shown schematically, of the yarn supply apparatus of FIG. 13.

The yarn 17 coming from a supply spool 152 supported on a roller pair 150, 151 is deflected by the drive shaft 150 in the manner shown in FIGS. 13-15. It extends through the eye 19' of the yarn guide arm 21' and from there via the yarn roller 158 to the yarn utilization station, so that the yarn reserve is once again formed between the drive roller 150 and the yarn roller 158; this yarn reserve is sensed and regulated, in the manner already described above, by the yarn guide arm 21'. The yarn guide arm 21' is subjected by the direct current motor 25, via the operating lever 27', to the command positioning force, which corresponds to the particular yarn tension that has been set. Once again, the yarn reserve is dimensioned such that it enables startup and discontinuance of the stepping motor 3 without the stepping motor falling out of step with the pulse signal supplied to it.

In the embodiment shown in FIG. 14 having two supply stations on both sides of the housing 1, as a rule each of the two rollers pairs 150, 151 protruding on opposite sides of the housing has its own driving stepping motor 3, which is regulated via its own yarn guide arm 21 and suitable electronics (FIG. 8). Both rollers of each pair of rollers 150, 151 can be synchronized separately with their own toothed belt drive as shown in FIG. 16; however, as is generally applicable for all the embodiments, an electric synchronization of the rollers 150, 151 is also possible, in such a way that each roller is coupled with its own stepping motor 3, as shown in FIG. 15, and both stepping motors are then synchronized with one another by electrical means.

Another alternative is that for a particular application, regulation via the yarn guide arm 21 is provided only for the roller pair 150, 151 associated with one supply station, while at the other supply station the yarn guide arm 21 actuates only a normal stop-motion device, which responds in the event of yarn breakage and so forth. The associated pair of rollers 150, 151 is then driven at constant rotary speed.

Finally, in other embodiments the yarns of a plurality of supply spools can be carried via a common yarn guide arm 21 having an associated control circuit, and via the associated control circuit the guide arm varies the roller drive in such a way that all the sensed yarns remain within the set command range for yarn tension.

The command force imposed on the movable guide element can be imposed per se, for example by a command spring that has a more or less steep spring characteristic. However, it has proved suitable for this command force to be substantially constant regardless of the travel distance. To this end, the movable yarn guide element can be coupled with an electromagnetic command value transducer that generates the command force, the regulating current of this transducer being adjustable. An example of an electromagnetic command value transducer is a permanent magnetic field direct current motor or some arrangement comparable to the measuring mechanism of a rotary coil measuring instrument or the like. For this kind of command value transducer generating a command torque, particularly simple conditions are attained if the movable yarn guide element is a yarn guide lever that is pivotably supported and carries a yarn guide device, the lever being rigidly coupled to the shaft of the command value transducer. An electromagnetic command value transducer has the advantage of very simple electrical adjustment of the command force.

Without entailing relatively high cost for circuitry, the electromagnetic command value transducer can be associated with the control circuit, which upon the occurrence of a change in the electrical signal emitted by the signal transducer intermittently imposes upon it a compensation signal that varies the command force in a direction counteracting the change in the yarn tension. In this manner, the movable yarn guide element is prevented from excessive deflection in the event of a sudden increase or decrease in yarn utilization, or is returned very quickly to its command position, resulting in very short control times. It is suitable for the compensation signal to be derived from the signal emitted by the signal transducer, via a differentiator.

Furthermore, the electromagnetic command value transducer can also have an input for signals that come from a central transducer and adjust the command force, so that remote control of the tension of the yarn supplied by the yarn supply apparatus is possible. Particularly in multi-system circular knitting machines, this presents the opportunity of briefly adjusting the yarn tensions in the individual knitting systems in a suitable manner or changing them by program from some central point—even during machine operation, without effort.

Finally, it is advantageous if the path of motion of the movable yarn guide element is limited, to which end sensors cooperating with the yarn guide element in the vicinity of the limits are provided, each sensor emitting a shutoff signal for the motor and/or for the machine. In that case separate stop-action means for when the machine runs out of yarn, the function of which is to stop the machine when a yarn break occurs, are unnecessary. At one limit of the movement path of the moveable yarn guide element, it is also possible for only the motor, and hence the yarn supply element, to be stopped; as a result, triggering of the yarn supply apparatus is attained via the quantity of yarn received by the yarn utilizing station. If the utilizing station does not accept any further yarn, then the yarn guide element migrates to one limit of its path of motion; the associated sensor emits a shutoff signal for the motor, which interrupts the supply of yarn. The excess amount of yarn supplied until the motor has stopped is received in the yarn reserve, as already mentioned at the outset, without breakdown of the yarn tension.

During normal operation of a knitting machine it is desirable for the individual knitting stations to be supplied with a precisely predetermined quantity of yarn that is dependent on the rotary speed of the machine. To attain this, the control circuit may have an input for a synchronizing signal coming from an external synchronization source, such as an rpm or speed transducer of the circular knitting machine, and the motor, upon reaching a rotary speed corresponding to the set command value yarn tension, can be synchronizable automatically by the control circuit by means of the synchronizing signal.

The drive motor of the yarn supply element is regulated in frequency; it may be a synchronous motor or, in particular, a stepping motor.

In the practical embodiment of the novel yarn supply apparatus, it is advantageous for the signal transducer coupled with the movable yarn guide element to emit an analog signal, and for the control circuit to have a voltage/frequency converter that is connected to the output of the circuit arrangement processing this analog signal and generates the frequency signal. Between the integrator and the voltage/frequency converter, a threshold circuit for the transmitted signal voltage can be provided, which prevents voltages below a lower threshold from reaching the input of the voltage/frequency converter. On its output side, the voltage/frequency converter advantageously also has an adjustable null-point suppression means, such that the output frequency is adapted to the starting/stopping frequency of the particular motor. In order to vary the position of the yarn guide element associated with a particular yarn travel speed, and hence to vary the size of the yarn reserve, the voltage/frequency converter is finally suitably provided with a device for varying the steepness of its characteristic curve.

With the motor at a standstill, the yarn tension is advantageously kept at a predetermined value by the control circuit, and this value may be equal to or less than the set command value. In the event that the yarn tension is adjusted to a relatively high value, then to prevent the tension exerted by the yarn in the position of repose from impairing the quality of the knitted goods or from allowing the yarn, firmly clamped in the yarn clamp of a striping apparatus, for example, from coming loose, it is suitable for the control circuit to have means by which the command value for the yarn tension can be lowered to a predetermined lower value, in the event that the yarn reserve has become larger by a predetermined extent than the original size, and returned to its original value, if the yarn reserve is shrinking again.

The yarn supply element in one embodiment of the yarn supply apparatus is a yarn wheel or yarn drum, around which the yarn is wrapped and by means of which the yarn can be supplied substantially without slip. However, the invention is equally applicable to yarn supply apparatuses in which the yarn supply element has at least one cylindrical drive roller that can be friction-coupled to the circumference of a yarn supply spool or yarn package. Yarn supply apparatuses of this kind, in which a yarn supply spool is itself driven at its circumference by friction coupling of its circumference to a drive roller, are particularly necessary for highly elastic yarns.

The invention has been described in connection with an analog system, which is reliable, inexpensive and can easily be constructed of well-known components. By using current technology, control can be based entirely on digital systems.

Various other changes and modifications may be made, and features described in connection with any one of the embodiments may be used with any of the others, within the scope of the inventive concept.

We claim:

1. Yarn supply apparatus for a yarn utilization textile machine, particularly for knitting machine, with electronic yarn tension control, having a rotatable yarn supply means (5,152) supplying yarn under essentially slipless conditions;

a drive motor (3) rotatably coupled to the yarn supply means, and operating under respectively steady state and transient operating conditions, including starting, acceleration, retarding and stopping;

variable frequency generating means (54,55,56) coupled to the motor and supplying the motor with power at variable frequency in which the frequency controls the operating speed and condition of the motor;

yarn tension sensing means (20,21,28) coupled to the yarn at a position between the yarn supply means and the yarn utilization textile machine, said yarn tension sensing means providing an electrical tension signal representative of yarn tension; and a control unit (52) coupled to receive the tension signal and providing an output signal controlling the variable frequency generating means to provide power to the motor at the frequency at which the yarn tension has a predetermined command value, and comprising in accordance with the invention yarn reserve forming means (15,16,19) located in the path of the yarn from the yarn supply means to the utilization machine, said yarn reserve forming means having a yarn capacity sufficient to supply yarn from said yarn reserve under starting conditions of the motor (3) and before the motor has reached the speed in which, under control of said command value, it can supply yarn at said tension command value;

yarn reserve sensing means (28,52) controlling said motor (3) to reestablish a predetermined yarn reserve in the yarn reserve forming means after change of yarn reserve from said predetermined reserve upon a transient operating condition of the motor; and circuit means (63,64) forming part of said control unit (52) limiting the rate of change of control of the variable frequency generating means, at least under starting condition of the motor (3), to a rate at which the motor, with the yarn supply means (5,152) coupled thereto, can operate in synchronism with the frequency of the supply power to thereby remain in step with said frequency.

2. The apparatus of claim 1, wherein said circuit means (63,64) limits the rate of change of control of the variable frequency generating means both under starting and accelerating, as well as under retarding and stopping conditions of the motor to operate in synchronism with the frequency of the supply power;

and wherein said yarn reserve forming means have a yarn capacity sufficient to accept an excessive length of yarn in the yarn reserve when the motor is operating under retarding and stopping conditions without additional yarn being accepted by the yarn utilization machine.

3. The apparatus of claim 1, wherein said circuit means (63,64) comprises an integrator coupled to receive said tension signal.

4. The apparatus of claim 2, wherein sid circuit means comprises two integrators (63,64), one integrator being associated with controlling the rate of change of the variable frequency when the motor is operating under tenion starting and accelerating conditions, and another integrator (64) limiting the rate of change of control of the variable frequency when the motor is operating under retarding and stopping condition;

and wherein said one integrator (63) has a longer time constant than said another integrator (64).

5. The apparatus of claim 4, wherein both integrators (63,64) comprise an RC circuit (72,73; 76) having a resistive component (72,73) and a capacitative component (76);

and controlled switching means (T2) changing the value of the resistive component in dependence on whether said one or said another integrator controls the rate of change of the variable frequency.

6. The apparatus of claim 1, wherein the yarn reserve forming means comprises a movable yarn guide element, movable over a predetermined path;

a fixed yarn guide element (15,16,158) being provided, associated with said movable yarn guide element and defining, in combination with said movable yarn guide element, an extended yarn path forming said yarn reserve;

yarn tension force generating means (25) are provided, applying a yarn tension force on said movable yarn guide element (21);

and wherein said yarn reserve sensing means (28,52) comprises signal generator means coupled to said movable yarn guide element (21) and providing a position signal representative of the position of said movable yarn guide element and hence of the amount of yarn in the reserve.

7. The apparatus of claim 6, wherein said signal generator means comprises means for scanning the position of the yarn guide element with respect to a fixed reference.

8. The apparatus of claim 6, wherein said position signal provided by said signal generator means (28) has a non-linear relationship with the extent of movement of the movable yarn guide element (21), said non-linear element defining a function in which, with increasing deflection of the movable yarn guide element (21) from a reference position, the position signal increases to a lesser degree.

9. The apparatus of claim 6, wherein said yarn tension force generating means (25) provides a yarn tension force on said yarn guide element (21) which is essentially uniform throughout the path of movement of said movable yarn guide element and independent of the extent of deflection thereof from a reference.

10. The apparatus of claim 6, wherein said movable yarn guide element (21) is a pivotably mounted yarn guide lever (21);

and a yarn guide eye (19), through which yarn from said yarn supply means to the utilizing machine is passed, secured to said lever.

11. The apparatus of claim 6, wherein said yarn tension force generating means (25) comprises an electromagnetic element coupled to the movable yarn guide element, and wherein the current through said electromagnetic element is adjustable to provide a predetermined yarn tension force on said movable yarn guide element.

12. The apparatus of claim 11, wherein said control unit (52) is coupled to said electromagnetic element (25), said control unit applying a signal to the electromagnetic element upon sensing a change in yarn reserve as sensed by said yarn reserve sensing means, said signal forming a compensation signal to counter a change in yarn tension by modifying the command force being applied by said electromagnetic element.

13. The apparatus of claim 12, further including a differentiator (59) receiving said position signal and forming a differentiated position signal, said differentiated position signal controlling the level of the compensation signal.

14. The apparatus of claim 11, further including a central yarn tension force control signal terminal (S,62) to provide a central command yarn tension force signal.

15. The apparatus of claim 6, including limit stop means (33,34) located at terminal positions of said predetermined path;

and sensing elements (35,36;43,44) operatively associated with the movable yarn guide element (21) and providing stop motion signals for at least one of: the motor (3); the yarn utilizing textile machine.

16. The apparatus of claim 1, further including an external synchronization input (106) to receive synchronizing signals (107) coupled to the control unit;

and automatic switchover means (105) coupled to the control unit (52) for automatically switching over control of the output signal which controls the variable frequency generating means, and hence the motor (3) to the external synchronization signal when the motor (3) has reached a speed at which the yarn is supplied under conditions at which the yarn tension has essentially said predetermined value and the reserve of yarn in the yarn reserve forming means is essentially constant.

17. The apparatus of claim 16, further including comparator means (110,111) comparing the external synchronization signal (107) with a yarn reserve sensing signal derived from said yarn reserve sensing means (28), said comparator controlling said switchover means (105) to change-over to control of the frequency generating means from said external synchronization signal when said yarn reserve has a predetermined value, indicative of steady state operating conditions of the motor (3) and the yarn utilizing textile machine.

18. The apparatus of claim 1, wherein said motor is a stepping motor.

19. The apparatus of claim 1, wherein said yarn reserve sensing means (28) provides a yarn reserve condition signal in analog form;
said control unit and circuit means (63,64) including analog signal processing means (63,64,65,66) and a voltage-frequency converter (67), said voltage-frequency converter being connected to and controlling the variable frequency generating means (54,55,56).

20. The apparatus of claim 19, wherein said circuit means comprises at least one integrator (63,64);
and wherein a threshold circuit (65) is provided, coupled between the at least one integrator and the voltage-frequency converter (67).

21. The apparatus of claim 19, wherein the voltage-frequency converter includes a null or 0 point suppression circuit to provide a minimum output frequency to control the start/stop frequency of the motor, and being matched to the start-stop motor frequency characteristics and requirements.

22. The apparatus of claim 21, further including means (84) coupled to the voltage-frequency converter (67) to change the conversion function, rate or steepness of voltage versus frequency.

23. The apparatus of claim 1, further including means (120) for maintaining yarn tension by said control unit (52) at a predetermined value with the motor (3) stopped, which value is less and up to the same as said command value.

24. The apparatus of claim 23, wherein said yarn tension maintenance means (120) forms part of said control circuit (53);
said yarn reserve sensing means providing a yarn reserve condition signal representative of the quantity of yarn reserve in the yarn reserve forming means, said yarn reserve condition signal being connected to said yarn tension maintenance means, said yarn tension maintenance means controlling the control unit to decrease yarn tension when said yarn reserve condition signal indicates a large reserve, and, upon change of the yarn reserve condition signal representative of normal yarn reserve, then controlling the control unit to reestablish the predetermined yarn tension command value.

25. The apparatus of claim 24, wherein the yarn reserve forming means comprises a movable yarn guide element, movable over a predetermined path;
a fixed yarn guide element (15,16,158) being provided, associated with said movable yarn guide element and defining, in combination with said movable yarn guide element, an extended yarn path forming said yarn reserve;
yarn tension force generating means (25) are provided, applying a yarn tension force on said movable yarn guide element (21);
wherein said yarn reserve sensing means (28,52) comprises signal generator means coupled to said movable yarn guide element (21) and providing a position signal representative of the position of said movable yarn guide element and hence of the amount of yarn in the reserve;
and wherein said yarn guide element (21) is movable in a first range (A+B−C), within which range, said control unit controls the yarn tension force generating means to apply yarn tension at said predeterined value;
and, if the quantity of yarn in the yarn reserve forming means increases, the movable yarn guide element moves into a second range (C);
and, when said second range is sensed, said means for maintaining yarn tension control the yarn tension force generating means to provide a yarn tension at a decreased value to provide control of yarn tension as a function of yarn reserve as sensed by said yarn reserve sensing means (28).

26. The apparatus of claim 25, wherein the yarn guide element (21) is operable in a first sub-range (A) forming an operating working range for normal operation in which yarn is effectively uniformly continuously supplied under effective steady state conditions to said utilizing machine;
and said yarn guide element is operable in a second sub-range (B) in which the yarn reserve increases, indicative of failure of the utilizing textile machine to accept further yarn, said yarn reserve condition signal, when the yarn guide element has reached said position, controlling the control unit to, in turn, control the variable frequency generating means to stop the motor (3).

27. The apparatus of claim 1, wherein (FIGS. 1–4) the rotatable yarn supply means comprises a yarn wheel or drum (5) on which a plurality of yarn windings or loops are formed, and supplying yarn to the yarn utilizing machine in essentially slip-free or slip-less manner.

28. The apparatus of claim 1, wherein (FIGS. 13–16) the rotatable yarn supply means comprises a drive roller (150) frictionally coupled with the circumference of a yarn supply spool (152).

29. The apparatus of claim 28, wherein a housing is provided from which said roller (150) extends;
a second cylindrical roller (151) being located in the housing, extending parallel and horizontally to said first roller (150) and defining a run-off position, said second roller being rotatable and spaced from said first roller, in a horizontal plane, by a spacing which is smaller than the diameter of a core (53) of said yarn roll (152).

30. The apparatus of claim 29, further including a common drive means (159,160) coupling the first and second roller (152) for synchronous rotation, said common drive means being driven by said motor (3).

31. The apparatus of claim 29, further including an individually frequency-controlled motor (3) coupled to the second roller (51) and electrically synchronized with said motor (3), said motor driving said roller (150).

32. The apparatus of claim 30, wherein said drive means comprises a positive engagement drive (159,160) for synchronous drive of both rollers (150,151).

33. The apparatus of claim 29, wherein said rollers (150,151) extend from said housing in opposite directions to position the housing between extending portions of the rollers, for placement of spools on both sides of the housing and balance loading of the housing.

34. The apparatus of claim 27, wherein more than one yarn roll is positionable on said yarn supply means;
and a common control unit (52) is provided for at least two of said rolls.

* * * * *